(12) United States Patent
Van Overloop

(10) Patent No.: US 9,885,164 B2
(45) Date of Patent: Feb. 6, 2018

(54) CANAL CONTROL SYSTEM

(71) Applicant: DELFT UNIVERSITY OF TECHNOLOGY, Delft (NL)

(72) Inventor: Peter-Jules Adriaan Tess Marie Van Overloop, Brouwershaven (NL)

(73) Assignee: DELFT UNIVERSITY OF TECHNOLOGY, Delft (NL)

( * ) Notice: Subject to any disclaimer, the term of this patent is extended or adjusted under 35 U.S.C. 154(b) by 479 days.

(21) Appl. No.: 14/369,420

(22) PCT Filed: Dec. 14, 2012

(86) PCT No.: PCT/NL2012/050893
§ 371 (c)(1),
(2) Date: Jun. 27, 2014

(87) PCT Pub. No.: WO2013/100763
PCT Pub. Date: Jul. 4, 2013

(65) Prior Publication Data
US 2014/0348588 A1 Nov. 27, 2014

(30) Foreign Application Priority Data
Dec. 27, 2011 (NL) .................................... 2008046

(51) Int. Cl.
*E02B 5/08* (2006.01)
*G05D 9/12* (2006.01)
*E02B 3/00* (2006.01)

(52) U.S. Cl.
CPC ............... *E02B 5/082* (2013.01); *E02B 3/00* (2013.01); *G05D 9/12* (2013.01)

(58) Field of Classification Search
None
See application file for complete search history.

(56) References Cited

U.S. PATENT DOCUMENTS

| 4,498,809 A | 2/1985 | Farmer |
| 2002/0031402 A1* | 3/2002 | French .................... C02F 1/008 405/80 |

(Continued)

OTHER PUBLICATIONS

International Search Report for PCT/NL2012/050893, dated Mar. 1, 2013.

*Primary Examiner* — Tuan Dao
(74) *Attorney, Agent, or Firm* — Nixon & Vanderhye PC

(57) ABSTRACT

The invention relates to a canal control system for controlling the water level or water flow in a canal system (2), comprising: (a) a centralized master controller (20), (b) a local slave controller (30), (c) a wireless communication system between the centralized master controller and the local slave controller, (d) a (fixed) reference point (8) or (movable) marker (11) relating to the water level in the canal system, and (e) an adjustable actuator (9) in the canal system, such as agate or pump, whereby the local slave controller comprises a mobile device (13) capable of displaying a human-readable instruction which an operator can act upon to set the adjustable actuator. The operator takes a picture of the water level and/or of the setting of the adjustable actuator. The data of the picture is used for updating a mathematical model of predictive control of the canal system and for calculating the setting of the present actuator and for determining which actuator is to be visited next by the operator.

39 Claims, 14 Drawing Sheets

(56) References Cited

U.S. PATENT DOCUMENTS

| | | | |
|---|---|---|---|
| 2005/0223792 A1* | 10/2005 | Pasternack | G01F 1/002 73/170.29 |
| 2006/0281116 A1* | 12/2006 | Angros | G01N 33/521 435/6.14 |
| 2007/0092110 A1* | 4/2007 | Xu | G06T 7/2033 382/103 |
| 2009/0018774 A1* | 1/2009 | Winkler | G01C 21/00 702/2 |
| 2010/0129154 A1* | 5/2010 | Cox | A01G 25/167 405/39 |
| 2011/0032145 A1* | 2/2011 | Hansen | G01C 21/3679 342/357.34 |
| 2011/0307221 A1* | 12/2011 | Higgins | G01F 15/063 702/187 |
| 2012/0021527 A1* | 1/2012 | Salzer | G01N 21/78 436/163 |

* cited by examiner

CANAL CONTROL SYSTEM

This application is the U.S. national phase of International Application No. PCT/NL2012/050893, filed 14 Dec. 2012, which designated the U.S. and claims priority to NL Application No. NL2008046, filed 27 Dec. 2011, the entire contents of each of which are hereby incorporated by reference.

The present invention relates to canal control systems. The invention is related in particular to canal control systems comprising a centralized master controller and a local slave controller.

The term canal system used herein is to be construed broadly. A canal system can be an irrigation canal system, a drainage canal system or a river with an adjustable control structure, for example a sluice, in its course.

Canals and open-water networks throughout the world serve to transport water. For irrigation, water needs to be transported from its source to users, while for drainage, abundant (rain) water needs to be evacuated out of the area. To manage the flow of the water, structures such as undershot gates, overshot gates and pumps are constructed in the canal. By adjusting the setting of these structures, the flows can be directed through the canal, to lateral canals, and in and out of reservoirs. Changing the setting of a structure is done manually by a person. This person or operator performs a control action based on local (visual) information and low-frequent oral communication with a central canal-operating authority. A disadvantage is that the flexibility and the performance of the water delivery is low. Changes in the supply schedule can only be made once every so many days, while instead the demand for water is variable during the course of the day. In order to match supply and demand as good as is possible, it is customary to over-supply. Usually, at least 10% of water in excess of the demand is supplied, only if in order to have water available at all locations at all times in the water network.

Another disadvantage with manually-operated canals is that operators can be bribed to give more water to certain users. Also, water is frequently stolen from the canal system or water network.

Over the last decades, an answer to the above-mentioned disadvantages of man-ually-operated canals and open water networks has been sought in canal automation. An example of this prior art is described in the patent publication GB-2187573. The pro-vision of water-level sensors, communication lines, databases for storage and analysis of measurements, central control, local PLC's, and electrical motors allows for water-delivery on demand. This allows for full flexibility in the delivery of water during the course of a day, for elimination of over-supplied losses, and for a direct reaction to rain-fall or changes in the demand for water. As a human operator is no longer required, an opportunity for bribery and consequential water losses is greatly reduced. Another advantage is that any location, where water is regularly stolen, can be traced from analysis of the measurements that are stored in a database of the central control.

However, for many small canals and open-water networks, especially those in developing countries, installing the technical equipment required for canal automation is simply too expensive. For larger canals, installation of the required technical equipment may be well worth the investment, but maintaining the installations is almost impossible because of the very openness of such systems that are vulnerable and exposed to various factors such as wear and tear, storm events, lightning, oxidation, vandalism, etc.

An object of the present invention is to provide an alternative canal control system.

It is another object of the present invention to provide a canal control system with which deviations from normal operating conditions can be easily detected.

It is a further object of the invention to provide a canal control system with which minor operational problems can be easily redressed.

It is a further object of the invention to provide a canal control system that provides for accurate and flexible water control.

It is yet another object of the present invention to provide a canal control system that provides an economical and efficient amount of capital investment in canal control equipment.

It is yet another object of the present invention to provide a canal control system that can be easily installed, and easily be brought into and kept in operation.

One or more of the above-stated objects are achieved with a canal control system according to the invention.

According to one aspect of the invention, a canal control system for controlling the water level or water flow in a canal system (2) comprises:

(a) a centralized master controller (20),
(b) a local slave controller (30),
(c) a wireless communication system between the centralized master controller and the local slave controller,
(d) a (fixed) reference point (8) or a (movable) marker (11) relating to the water level or water flow in the canal system,
and
(e) an adjustable actuator (9) in the canal system, such as an adjustable gate or pump, whereby the local slave controller comprises a mobile, wireless device (13) that in turn comprises (i) technical means for viewing or recording a measurement of the water level or water flow relative to the (fixed) reference point (8) or (movable) marker (11) in the canal system, (ii) technical means for sending the measurement of the water level or water flow as an input signal to the centralized master controller, (iii) technical means for receiving an output control signal from the centralized master controller, and (iv) a user interface for displaying a human-readable instruction based on the output signal received from the centralized master controller.

A technical advantage is that the canal control system provides for accurate and flexible water flow control due to its degree of technical automation together with a degree of redundancy in its mode of operation because no vulnerable technical equipment needs to be installed at a control point and a human operator is required for checking, operating and maintaining the local canal infrastructure, including the adjustable actuator, at and around a measurement point in the canal system.

Preferably, the mobile wireless device comprised in the local slave controller in turn further comprises (v) technical means for viewing or recording a measurement of the state or setting of the adjustable actuator, such as a gate or pump, in the canal system, and (vi) technical means for sending the measurement of the state or setting of the adjustable actuator as an input signal to the centralized master controller. The advantage thereof is that any regular occurrences can be dealt with through the centralized master controller while at the same time any irregularity, for example, an animal carcass stuck in a gate, can also be dealt with at the discretion of the human operator who informs the centralized master controller about the irregularity in the same quick and easy way in which he informs the centralized master controller about the regular occurrences.

The main goal of the canal control system according to the invention is to regulate the flow of water in the canal system. One way of achieving this goal is through a derivative way, e.g. by means of measuring and controlling the water level in a canal system. The water level is measured against a fixed point of the canal structure, e.g. a measuring line painted on or near a canal structure. Another way of achieving said goal is through a less derivative way, in which the relative flow of water in a canal system can be regulated by measuring and controlling the setting of an adjustable actuator such as a gate or a pump. Yet another way of achieving said goal is in a direct way, in which the flow of water in a canal system can be regulated by measuring and controlling the absolute flow of water, e.g. by means of a flow meter that can indicate the flow of water in absolute terms. Since measuring and control-devices, e.g. a gate or pump or flow meter, may be partly submerged in certain operating conditions, a movable marker that is visible above the water line is used to indicate the setting of the measuring and control-device, i.e. the setting of the gate or pump or flow meter.

Preferably, the centralized master controller and the local slave controller are configured to interact mutually in the execution of a predictive control algorithm using a mathematical model of the canal system. A related advantage is that the next setting for the adjustable actuator at a particular reference point or marker can be calculated by the centralized controller. Another advantage is that a decision on if and how to redress any irregularity at the particular reference point or adjustable actuator can also be taken into account in the calculations according to the predictive control algorithm.

In a further embodiment, instead of calculating control actions for all adjustable canal actuators at the same time and at a constant time interval, the predictive control algorithm is configured to calculate control actions for all adjustable canal actuators at time instances when a local operator can actually reach a particular adjustable canal actuator. An advantage is that calculations based on the algorithm using the model of predictive control can be made without any great loss of performance as regards the accuracy of settings of any adjustable actuator.

Preferably, the centralized master controller and the local slave controller are implemented in separate devices. A related advantage is that all processing of data can be done centrally for the entire canal system which allows for the use of high-performance processing equipment (both hardware and software) at the centralized master controller while the local slave controller can be limited to a lightweight, e.g. hand-held, device.

Alternatively, the centralized master controller and the local slave controller are integrated in a single mobile device. A related advantage is high-performance calculations can be traded off against less high-performance calculations and a decrease of the dependency of the canal control system on fail-proof communication lines which may well be the better choice in areas that are remote and only sparsely covered by mobile communication systems.

According to another aspect of the invention, the centralized master controller and the local slave controller are configured additionally to interact mutually to update the mathematical model of the canal in real-time. A related advantage is that the estimated accuracy of calculations is enhanced. Another advantage is that any irregularities at any point of the canal system can also be taken into consideration for one or more particular reference points or actuators in the canal system.

Preferably, the canal control system additionally comprises means for verification of the location of any given reference point or marker in the canal system. A related advantage is that any fraudulent action at the reference point or marker can be noted independently of the local operator.

Preferably, the means for verification comprise a digitally-readable identifier, e.g. a bar code or a QR-code, positioned at or near the (fixed) reference point or (movable) marker in the canal system. A related advantage is the location of the reference point or marker can be determined at an absolute, known level and orientation, and that this location can be used as a reference with respect to one or more other points at or around the local adjustable actuator.

More preferably, at least two identifiers are used at or near the (fixed) reference point or (movable) marker in the canal system. An advantage is that the location of any local point can be determined accurately for absolute positioning in space.

Preferably, the canal control system comprises additional means for allowing access to the adjustable actuator in the canal system. A related advantage is only operators whose identities have been verified, can be authorized and allowed access to adjust the adjustable actuator. More preferably, the additional means comprise a security code-based means such as a digitized lock. An advantage is that also semi-skilled persons can act as a local operator.

According to another aspect of the invention, the centralized master controller and the local slave controller are configured to interact mutually in the execution of a predictive control algorithm using a mathematical model of the canal system using software that comprises code for water-level recognition adapted for use with a mobile device. An advantage is that the level of the water line can be determined accurately which enhances the accuracy of any calculations of a setting of an adjustable actuator.

Preferably, the centralized master controller and the local slave controller are configured to interact mutually in the execution of a predictive control algorithm using a mathematical model of the canal system using software that comprises code for a model of predictive control adapted for use with a mobile device. An advantage is that a slightly modified, e.g. abridged, version of a model of predictive control can also be used without any great loss of performance as regards the accuracy of the settings of any adjustable actuator.

Preferably, the code for a model of predictive control comprises code for calculating control actions for adjustable actuators in the canal system at time instances during which an operator operating the local slave controller can reach the next adjustable actuator which is to be adjusted. A related advantage is that calculations based on the algorithm using the model of predictive control can be made without any great loss of performance as regards the accuracy of settings of any adjustable actuator. Another related advantage is that the execution of the algorithm using the model of predictive control is speeded up without any great loss of performance as regards the accuracy of the settings of any adjustable actuator.

According to another aspect of the invention, the software of the canal control system additionally comprises code for updating the model of predictive control adapted for use with a mobile device. An advantage is that the flexibility and the accuracy of calculations are enhanced and any irregularities at any point in the canal system can also be taken into account while making the calculations of settings of one or more adjustable actuators.

Preferably, the code for updating the model of predictive control comprises code with which only the measurement of the water level and/or the setting of an adjustable actuator which has (have) been sent to the centralized master controller is (are) used for updating the model of predictive control. An advantage is that calculations based on the algorithm using the model of predictive control can be streamlined without any great loss of performance as regards the accuracy of settings of any adjustable actuator.

According to another aspect of the invention, the software of the canal control system additionally comprises code for providing an optimum calculated solution for the next reference point or marker in the canal system at which to take a measurement of the water level and/or of the setting of an adjustable actuator after a measurement of the water level and/or the setting of an adjustable actuator at a particular reference point or marker has been (have) processed by the centralized master controller. An advantage is that the route that can best be followed by a local operator around the canal system can be optimized, which leads to an efficient use of time and resources needed to operate and maintain the canal system.

Common mobile wireless devices provided with standard cameras will usually suffice during use of the present invention. At present, the use of cameras with a certain number of pixels capable of forming 2-D pictures has sufficient resolution as to allow for an accurate reading of water levels and of settings of parts of canal structures. During darkness, additional lighting may be required. Cameras allowing 3-D pictures or cameras operating at non-visible frequencies can also be used.

Preferably, the canal control system according to the invention at any given reference point or marker comprises a remote-controlled measurement-taking device. A webcam or suchlike device can be used in addition to, or instead of, the mobile device comprised in the local slave controller operated by a person at a given reference point or marker. This may be advantageous in the case of e.g. a large section of the canal system comprising several mutually combined adjustable actuators, an adjustable actuator arranged in a tight space such that it can be easily adjusted though, due to spatial restrictions, a measurement cannot be easily taken by a human operator.

Preferably, the canal control system according to the invention at any given reference point or marker comprises a measuring or recording device operating at a non-visible wave frequency, such as an infra-red (IR-) device, or at adjustable time intervals. This is advantageous in that measurements can still be taken during adverse weather and visibility conditions, and that canal control can be performed on the basis of time-lapse recordings of e.g. water-turbulence patterns, at or around a reference point or marker of the canal system.

According to yet another aspect of the invention, a method of controlling the water level or water flow in a canal system using a canal control system according to the invention comprises the phases of: (A) taking a measurement of the water level or water flow relative to a reference point or marker in the canal system using the mobile, wireless device comprised in the local slave controller; (B) sending the measurement of phase A to the centralized master controller for processing, updating the mathematical model of the canal system, execution of a predictive control algorithm using a mathematical model of the canal system for calculating the control setting for the reference point or marker of which the measurement was sent, and sending the calculated control setting from the centralized master controller to the local slave controller; and (C) reading of the calculated control setting by a person operating the local slave controller, and adjustment of the adjustable actuator in the canal system, such as an adjustable gate or pump accordingly. The method preferably also comprises a phase (D) for taking another measurement of the water level or water flow relative to a reference point or marker in the canal system using the mobile, wireless device comprised in the local slave controller after adjustment of the gate or pump according phase (C). An advantage is that the canal control system provides for accurate and flexible water control due to its degree of technical automation together with a degree of redundancy in its mode of operation because no vulnerable technical equipment needs to be installed at a control point and a human operator is required for checking, operating and maintaining the local canal infrastructure, including the adjustable actuator, at and around a reference point in the canal system.

The above and further preferred embodiments and technical advantages of the invention will now be described, by way of example, with reference to the accompanying drawings in which.

FIGS. 3-6 in combination depict a flow chart of a method of mobile canal control, applied with the aid of a local operator under trusted conditions, using a canal control system in accordance with the invention;

FIGS. 7-10 in combination depict a flow chart of a method of mobile canal control, applied with the aid of a local operator under supervision, using a canal control system in accordance with the invention; and FIGS. 11-14 in combination depict a flow chart of a method of mobile canal control, applied with the aid of uninitiated volunteers, using a canal control system in accordance with the invention.

Figure 1:
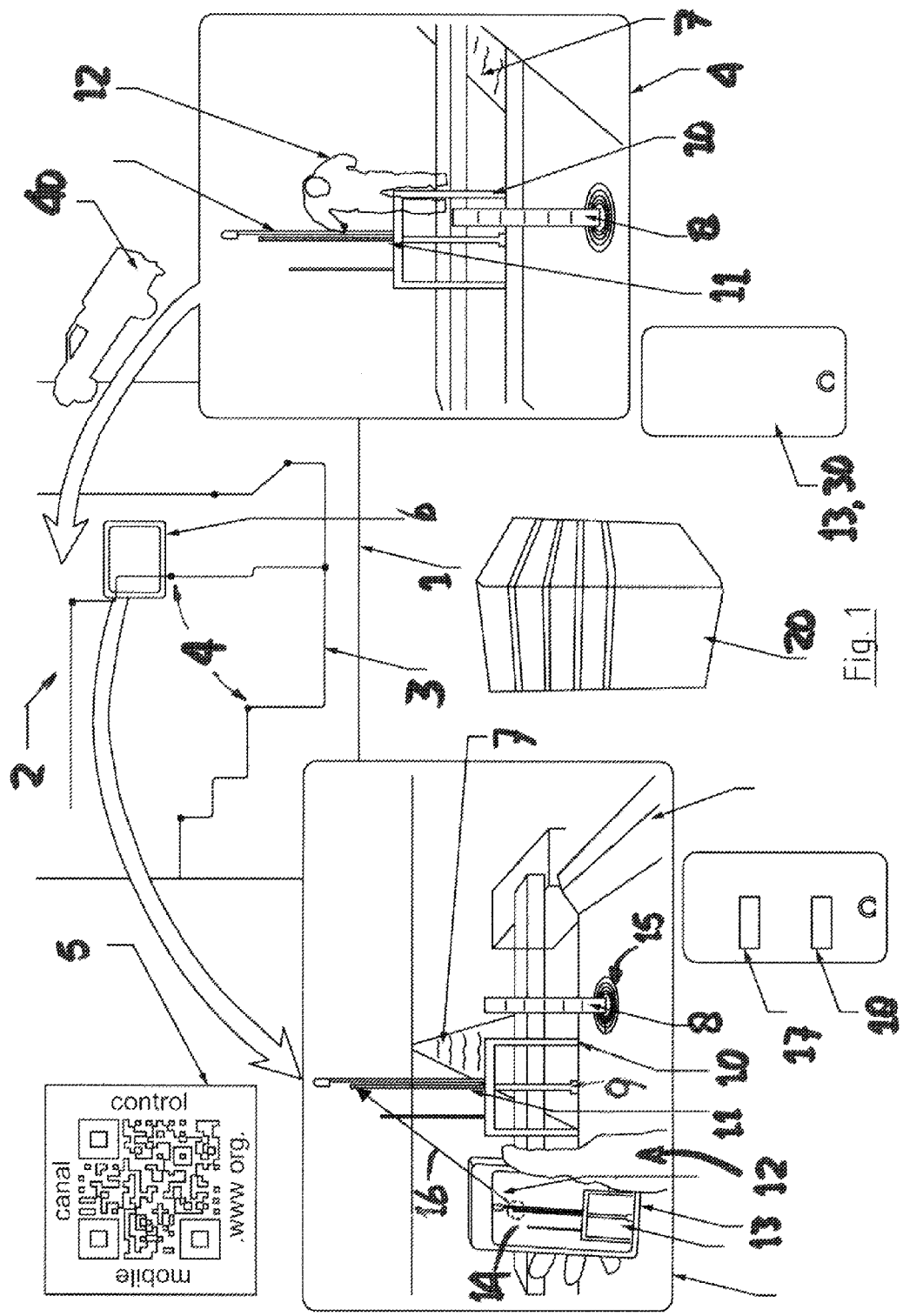
FIG. 1 is a schematic overview of a canal control system according to the invention and one embodiment of a method of using the same at a local measuring point.

FIG. 1 is a schematic overview of a canal control system according to the invention and a method of using the same at a measuring point at or around a local structure, a reference point of the canal system, when a trusted person can act as a local operator. Referring to FIG. 1, a map 1 depicts a part of a canal system 2. A route 3 through the canal system as to be followed by an local operator shows the lay-out of several measuring points at or around local structures 4, e.g. an adjustable gate or pump, of the canal system. Each local structure 4 is marked by an identifier 5, for example a QR-code. The identifier serves as a reference for determining the absolute position in space of any local point. For example, the absolute position and orientation in space of any fixed part of the local structure can be used as a reference to determine the water level or the setting of an adjustable actuator comprised at that particular local structure.

The canal structure and some of the actions to be taken by an operator at section 6 will now be described. In this example, a local structure 4 spans across the canal 7. The local structure comprises a water-level indicator 8, a drive unit (not shown) for an adjustable gate 9 that, in this example, comprises a fixed part 10 and an adjustable (movable) part that is submerged. The gate is provided with an extension rod 11 for visually indicating the gate level which would otherwise not be easily seen and recorded by an operator 12. The identifier, e.g. a QR-code, is provided at any suitable position at or around the local structure where it can be verified. Markings indicating the position in which an operator must stand in order to ensure that he can take a picture correctly, e.g. a pair of feet painted on the ground, are not shown. The hands of the operator are shown holding a mobile device 13 that is comprised in the local slave controller 30 according to the invention. The screen display 14 of the mobile device is shown portraying 16 the extension rod 11 (a movable marker indicating the setting of the adjustable gate). In this example, both the water line 15 and the setting 16 of the adjustable gate are to be measured. Thus the water line 15 as referenced against the water-level indicator 8 will normally also be portrayed on the screen display of the mobile device, although it is not shown as such in FIG. 1. The operator checks that both measurements are visible on the screen display of his mobile device. The user interface of the mobile device 13 may display the water-line measurement 17, e.g. "Water level NB12=0.44 m," and the gate setting 18, e.g. "Gate level NB12=0.23 m" and additional information on the screen of the mobile device confirm as a visual confirmation to the operator that his actions are correct and are accepted. The location is verifiable on the basis of the geographical coordinates of the local structure, in particular by means of the known coordinates of the identifier, which are known at the centralized master controller and/or the location of the mobile device used for transmitting the data from the local slave controller to the centralized master controller.

Once a picture of the water level 17 and the gate setting 18 has been taken, it is sent, together with the coordinates of the geographical location of the canal structure, by means of the data connection of the mobile device to a centralized master controller 20 at a different location. The centralized master controller 20 processes the data to interpret the picture it receives from the local slave controller, to update the model of predictive control of the canal, to use predictions of boundary conditions relating to the model, such as water demand and rain fall, and to calculate currently required and future control actions, This all will be described in further detail later.

Instructions intended to be implemented by the operator, e.g. 'Raise gate NB12 by 0.06 m' and 'Move on to (following local structure) NB14 within 20 minutes', are sent by the centralized master controller to the local slave controller which displays these instructions in a human-readable form on the screen of the mobile device 13 used by the operator. As shown schematically at the right-hand side of FIG. 1, the operator can then implement these instructions by changing the setting of the adjustable actuator, in this example a gate, and optionally (because in this example, the operation is being conducted under trusted conditions and with a trusted operator) taking another picture of the water level and/or of the setting of the gate after he has changed the latter. Subsequently, the operator can move on to the next local structure to be visited as communicated to him by the centralized master controller, moving about e.g. as depicted by the vehicle 40 and the arrow indicating its movement.

Figure 2:
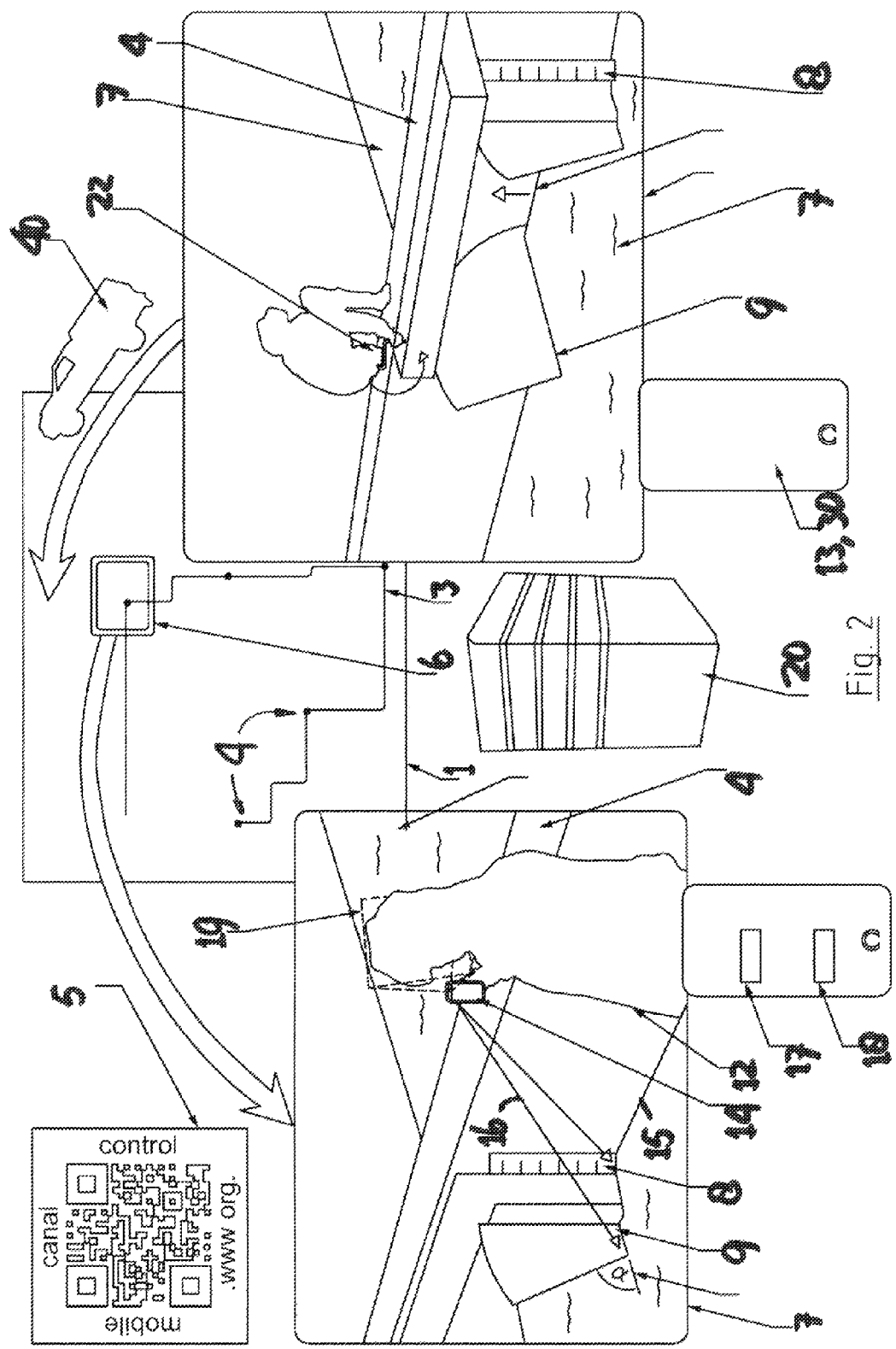
FIG. 2 is a another schematic overview of a canal control system according to the invention and another embodiment of the method of using the same at another local measuring point.

FIG. 2 is a schematic overview of a canal control system according to the invention and a method of using the same at a measuring point at or around a local structure when a person can act as a local operator under supervision of the centralized master controller. In FIG. 2, a map 1 depicts a part of a canal system 2. A route 3 through the canal system as to be followed by an local operator shows the lay-out of several measuring points at or around local structures 4, e.g. an adjustable gate or pump, of the canal system. Each local structure 4 is marked by an identifier 5, for example a QR-code. Each local structure 4 is marked by an identifier 5, for example a QR-code. The identifier serves as a reference for determining the absolute position in space of any local point. For example, the absolute position and orientation in space of any fixed part of the local structure can be used as a reference to determine the water level or the setting of an adjustable actuator comprised at that particular local structure.

The canal structure and some of the actions to be taken by an operator at section 6 will now be described. In this example, a local structure 4 spans across the canal 7. The local structure comprises a water-level indicator 8 and a manually adjustable gate 9. The identifier, e.g. a QR-code 5, can be provided at any suitable position at or around the local structure where it can be verified. Markings indicating the position in which an operator must stand in order to ensure that he can take a picture correctly, e.g. a pair of feet painted on the ground, are not shown. An operator 12 is shown holding a mobile device 13 that is comprised in the local slave controller 30 according to the invention. The operator 12 is portrayed as taking a picture of both the setting of the adjustable gate 9, indicated by the angle α, and the water line 15 as referenced against the water-level indicator 8. The operator checks that both measurements are visible on the screen display of his mobile device. The taking of a picture is made easy for an operator when e.g. two QR-codes are used. All a semi-skilled operator needs to do is to position his feet on foot markings provided on the ground (though not shown in this example) so that his body points in the right direction and right orientation with respect to the reference point and the adjustable actuator and then ensure that both codes are visible on the screen of his mobile device. The user interface of the mobile device 13 may display the water-line measurement 17, e.g. "Water level NB12=0.44 m," and the gate setting 18, e.g. "Gate level NB12=0.23 m" and additional information on the screen of the mobile device confirm as a visual confirmation to the operator that his measurements are correct. The dashed-line frame 19 around the operator's head schematically depicts that a picture of the operator's face is taken by means of a camera at the front of the mobile device. This picture is for the purpose of verifying the identity of the operator as will be described in further detail later.

Once a picture of the water level and the gate setting has been taken, it is sent, together with the coordinates of the geographical location of the canal structure and a picture of the operator's face, by means of the data connection of the mobile device to a centralized master controller 20 at a different location. The centralized master controller 20 processes the data to verify the identity of the operator, to interpret the picture it receives from the local slave controller, to update the model of predictive control of the canal, to use predictions of boundary conditions relating to the model, such as water demand and rain fall, and to calculate currently required and future control actions. This all will be described in further detail later.

Once the identity of the operator has been verified, instructions intended to be implemented by the operator, e.g. 'Unlock code is 3852', 'Raise gate NB12 by 0.06 m' and 'Move on to (following local structure) NB14 within 20 minutes', are sent by the centralized master controller 20 to the local slave controller 30 which displays these instructions in a human-readable form on the screen of the mobile device used by the operator. The operator can then implement these instructions by (in this example, manually at 22) changing the setting of the adjustable actuator, in this example a gate, and preferably taking another picture of the water level and/or of the setting of the gate 9 after he has changed the latter. Subsequently, the operator can move on to the next local structure to be visited as communicated to him by the centralized master controller, moving about e.g. as depicted by the vehicle 40 and the arrow indicating its movement.

Figure 3:
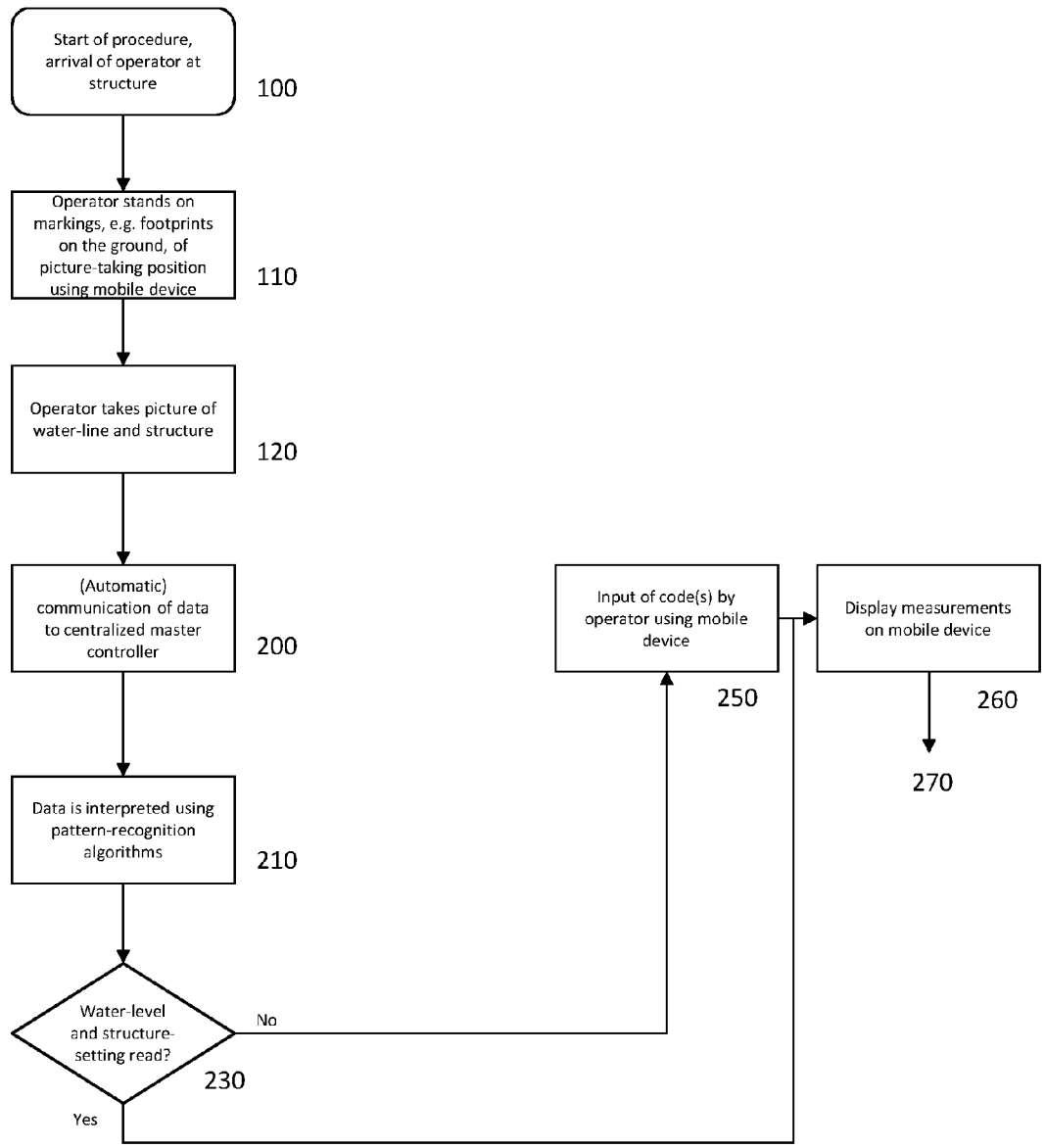
Figure 4:
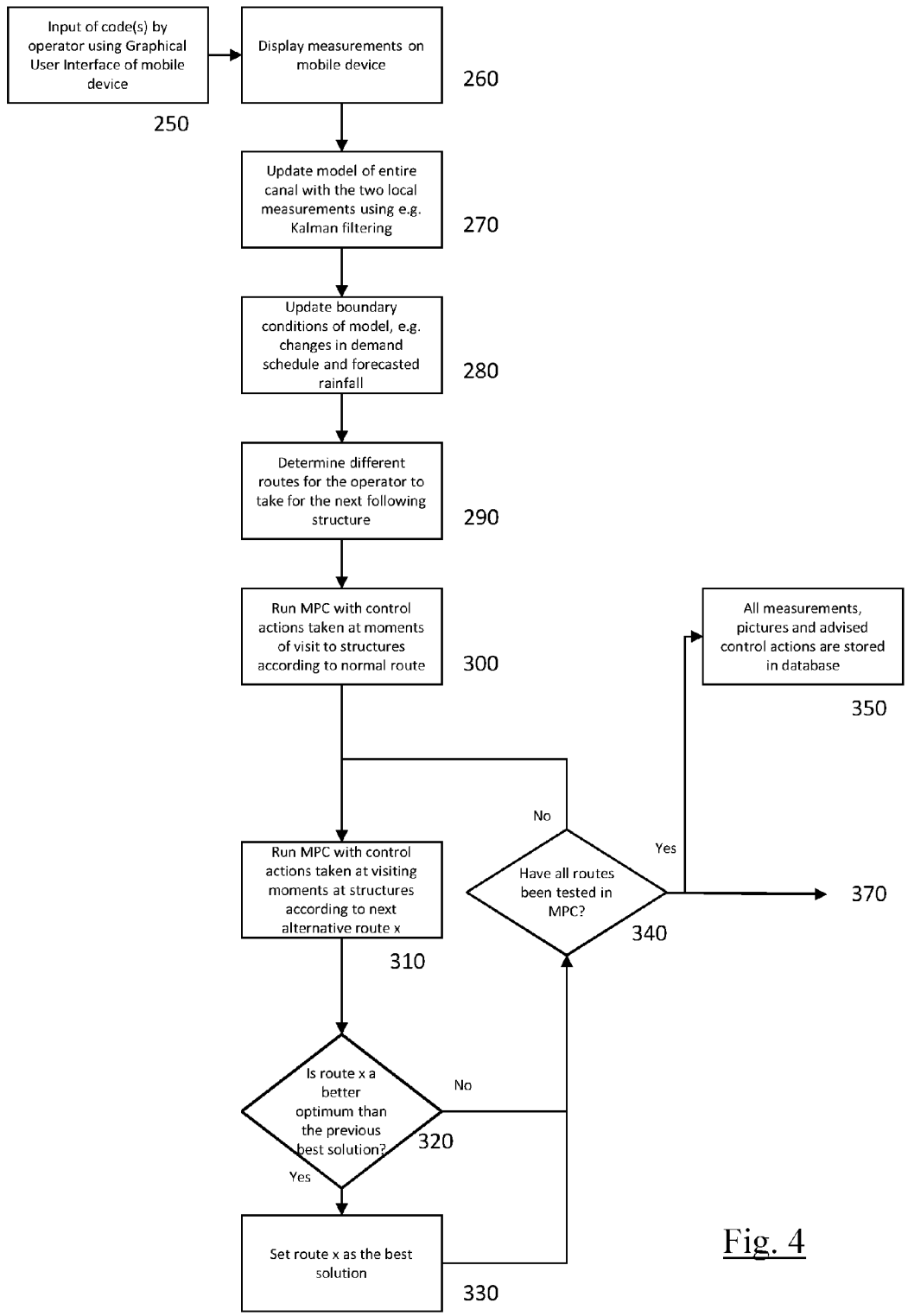
Figure 5:
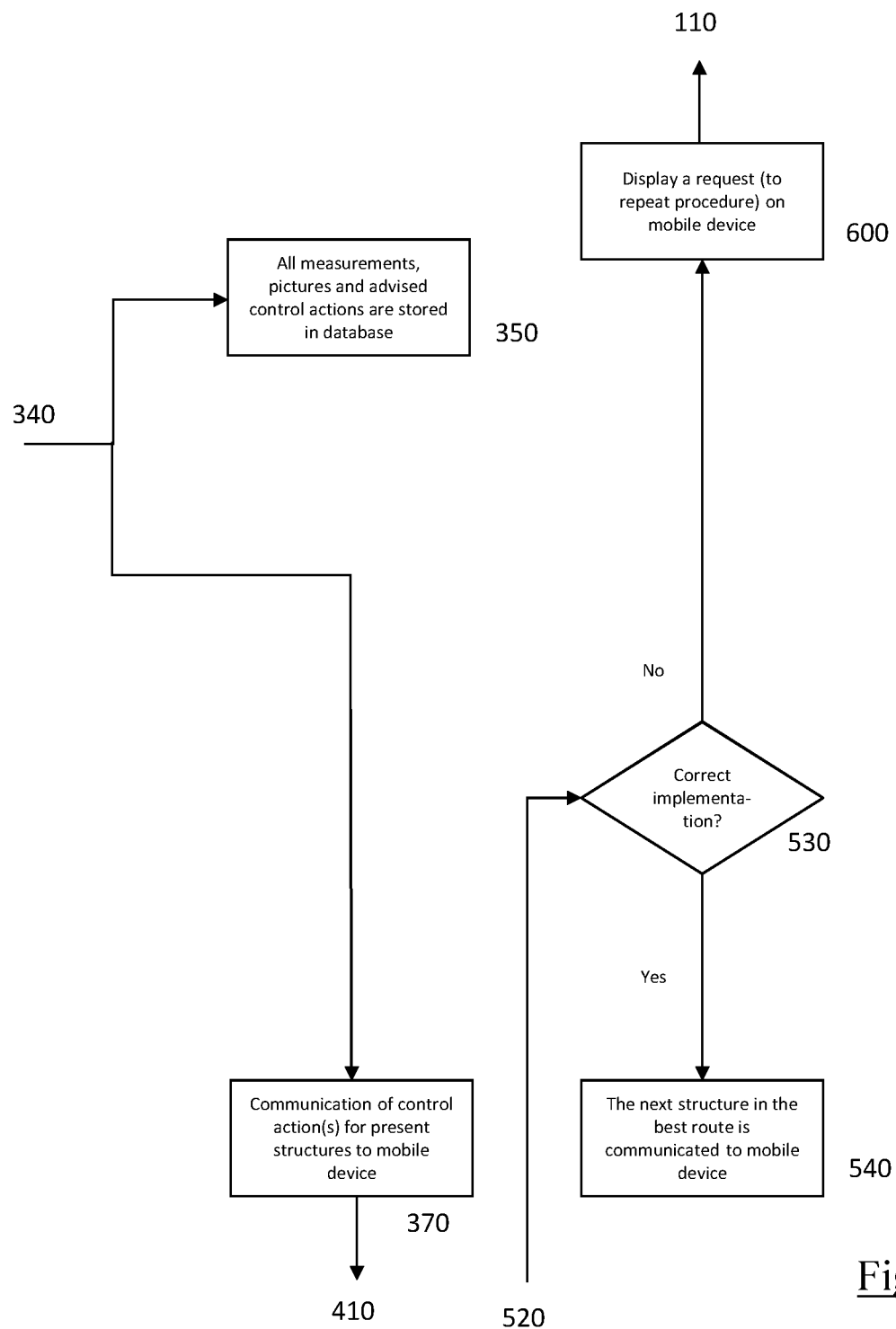
Figure 6:
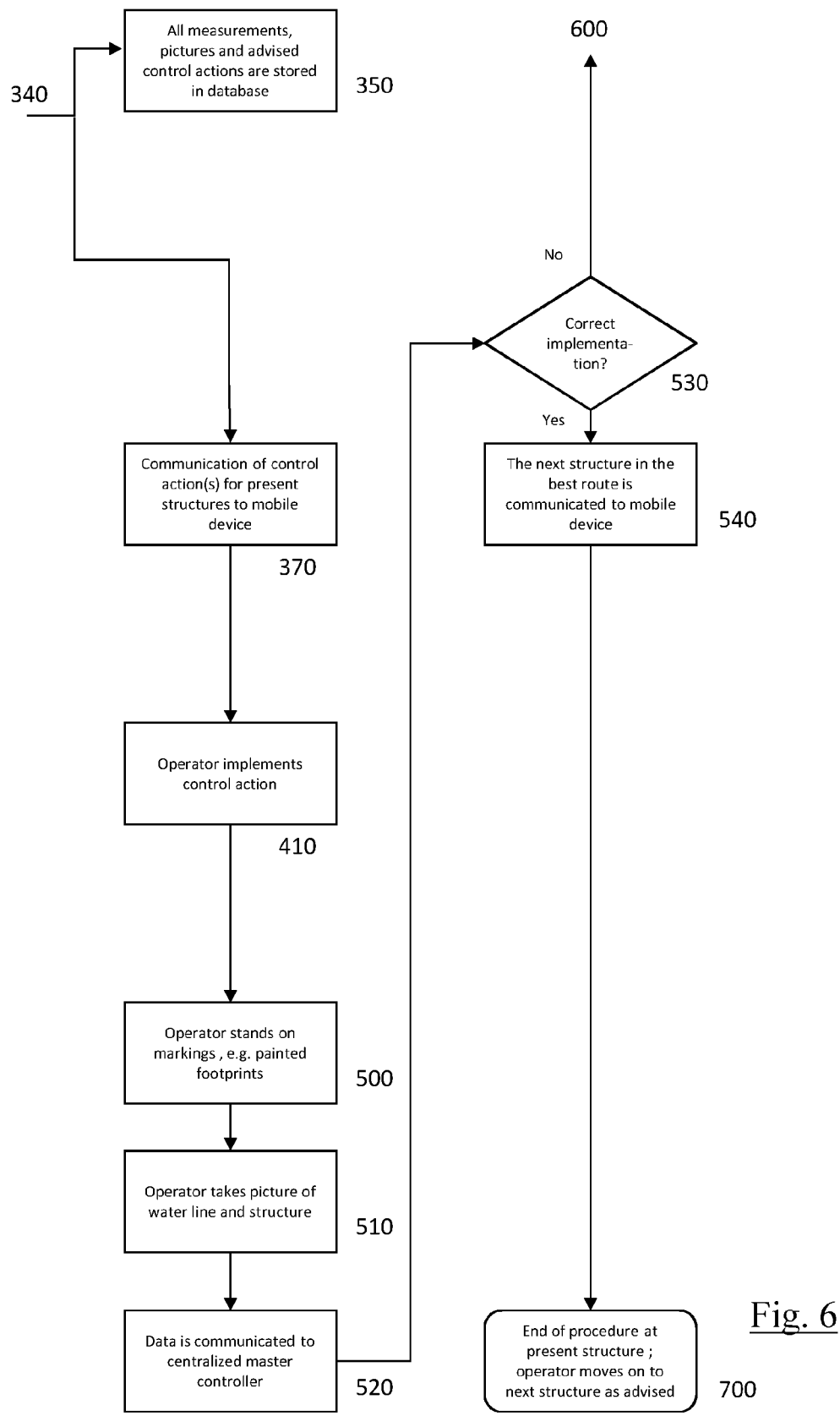
Figure 7:
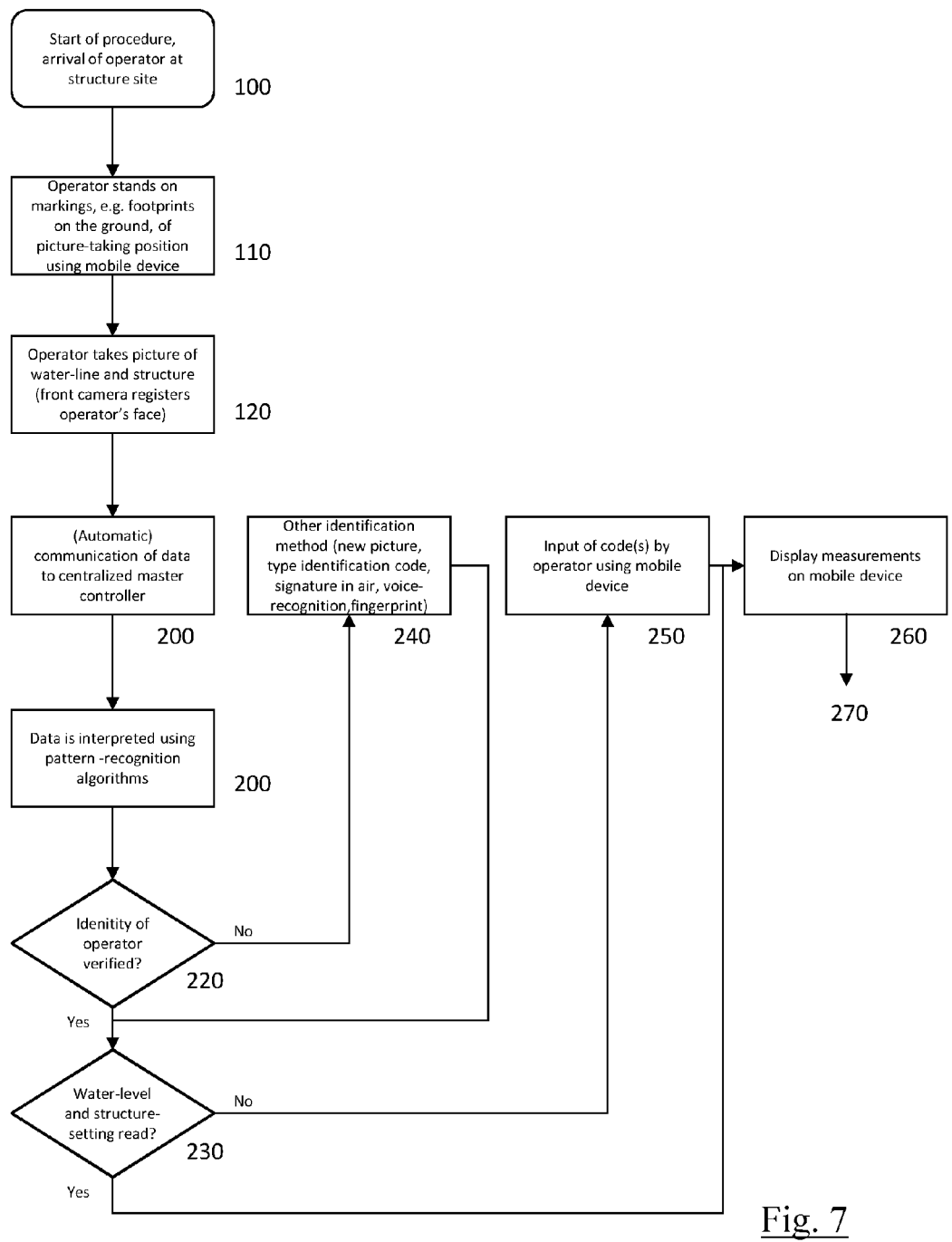
Figure 8:
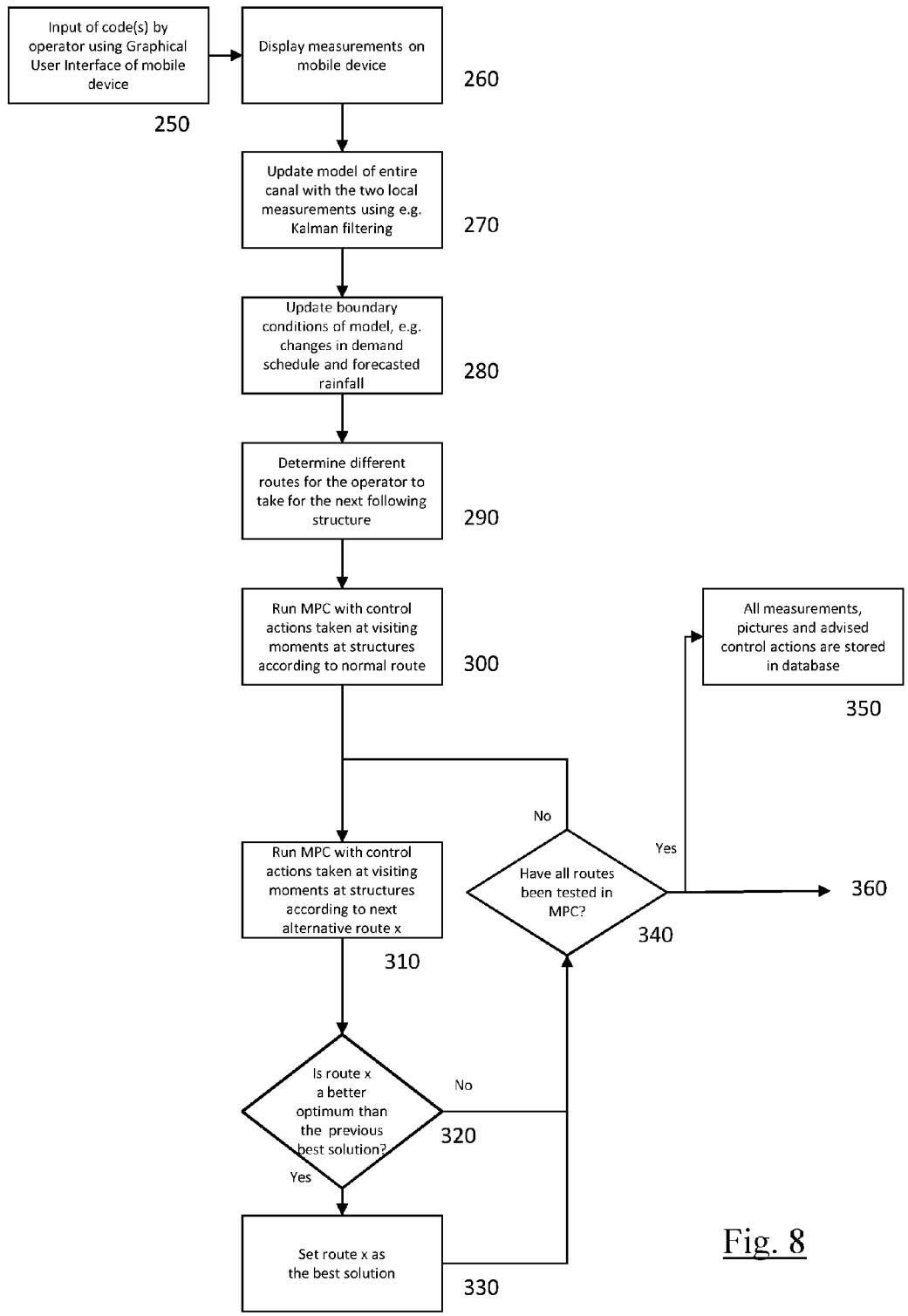

FIGS. 3-6 in combination depict a flow chart of a method of mobile canal control, applied with the aid of a local operator under trusted conditions, using a canal control system in accordance with the invention. The steps (actions, decisions, etc.) in the blocks are self-explanatory. In FIG. 3, blocks 100, 110 and 120 denote the steps of Phase A, namely taking a measurement of the water level relative to a (fixed) reference point and/or of the setting of the adjustable actuator comprised in the local structure relative to a (movable) marker, in the canal system using a mobile, wireless device comprised in the local slave controller. Phase A will described further later. Blocks 200-370 together denote the steps of Phase B, namely sending the measurement of phase A to the centralized master controller for processing, updating the mathematical model of the canal system, execution of a predictive control algorithm using a mathematical model of the canal system for calculating the control setting for the reference point or marker of which the measurement was sent, and sending the calculated control setting from the centralized master controller to the local slave controller. Phase B will be described further later. Block 410 in FIG. 6 denotes the steps of Phase C which will be described further later. Blocks 500-700 of FIG. 6 denote the steps of Phase D. Phase D will be described further later.

Figure 9:
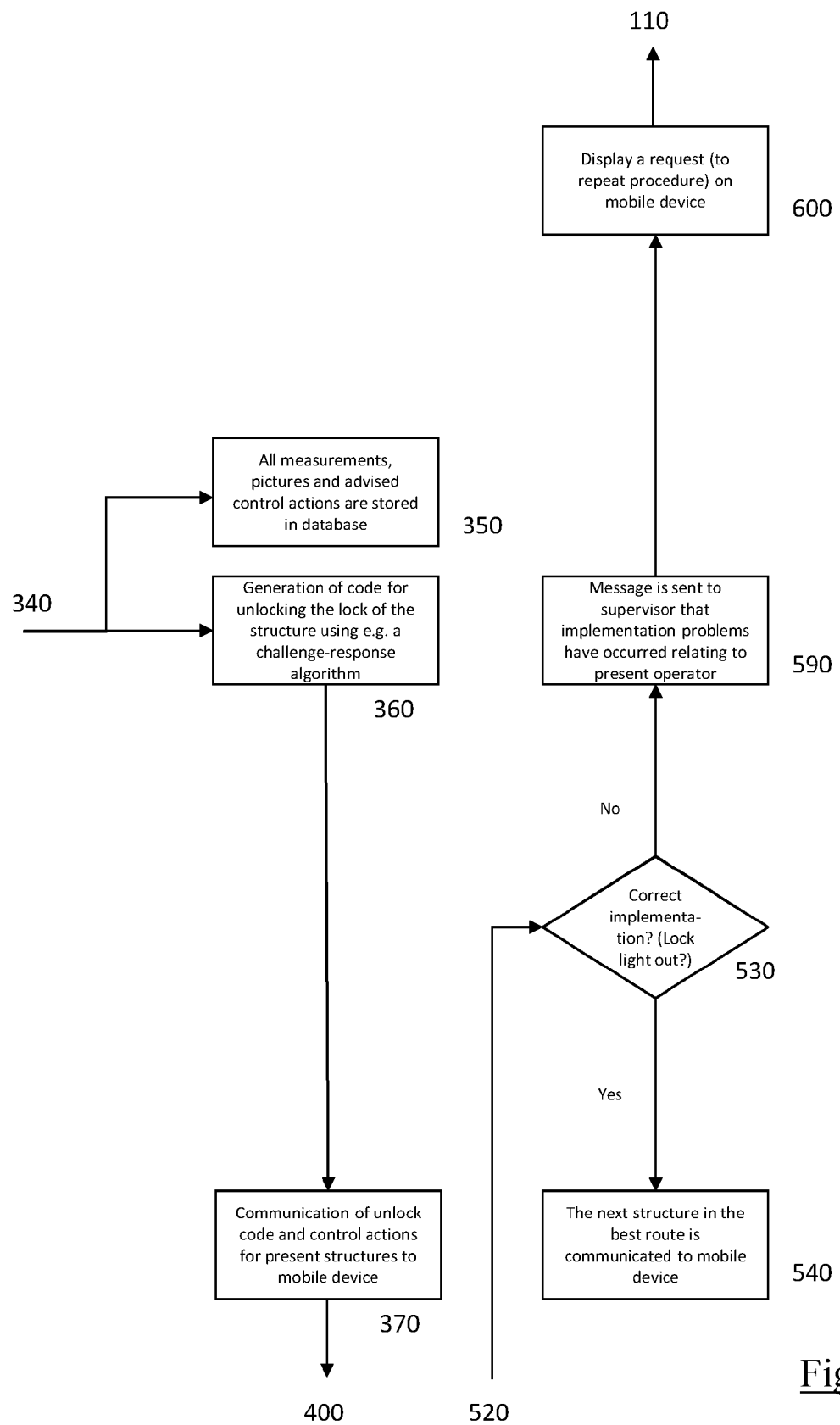
Figure 10:
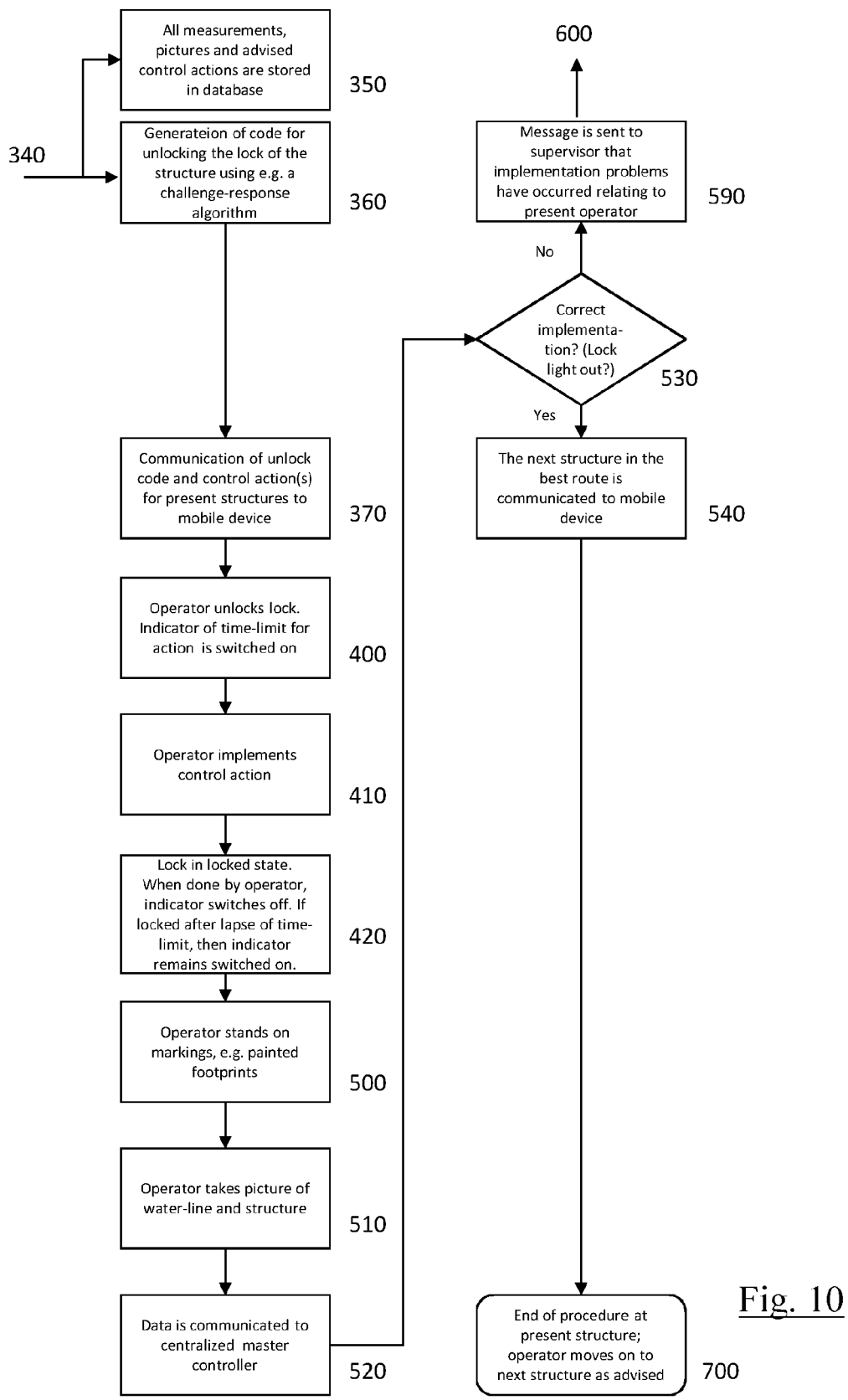
Figure 11:
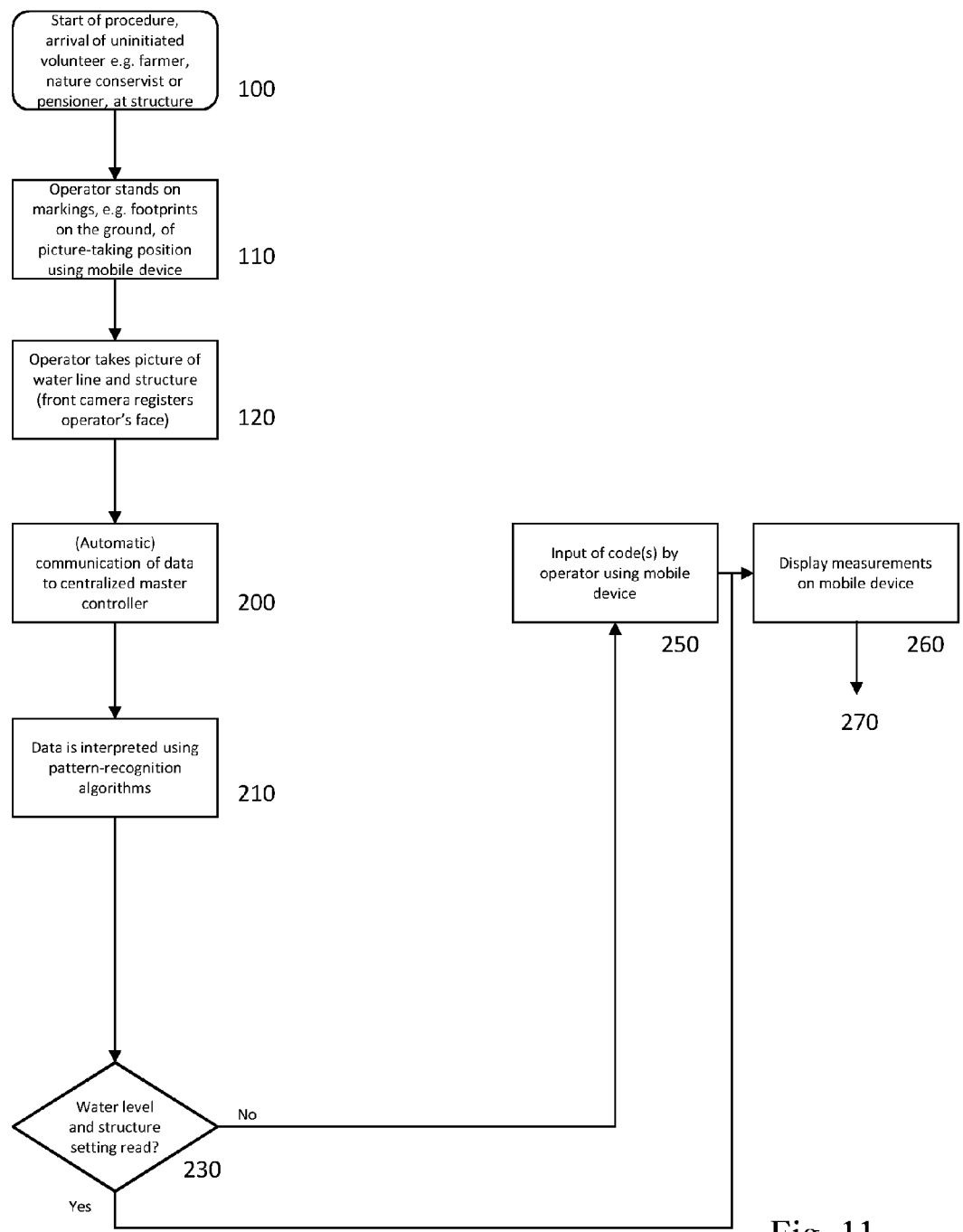
Figure 12:
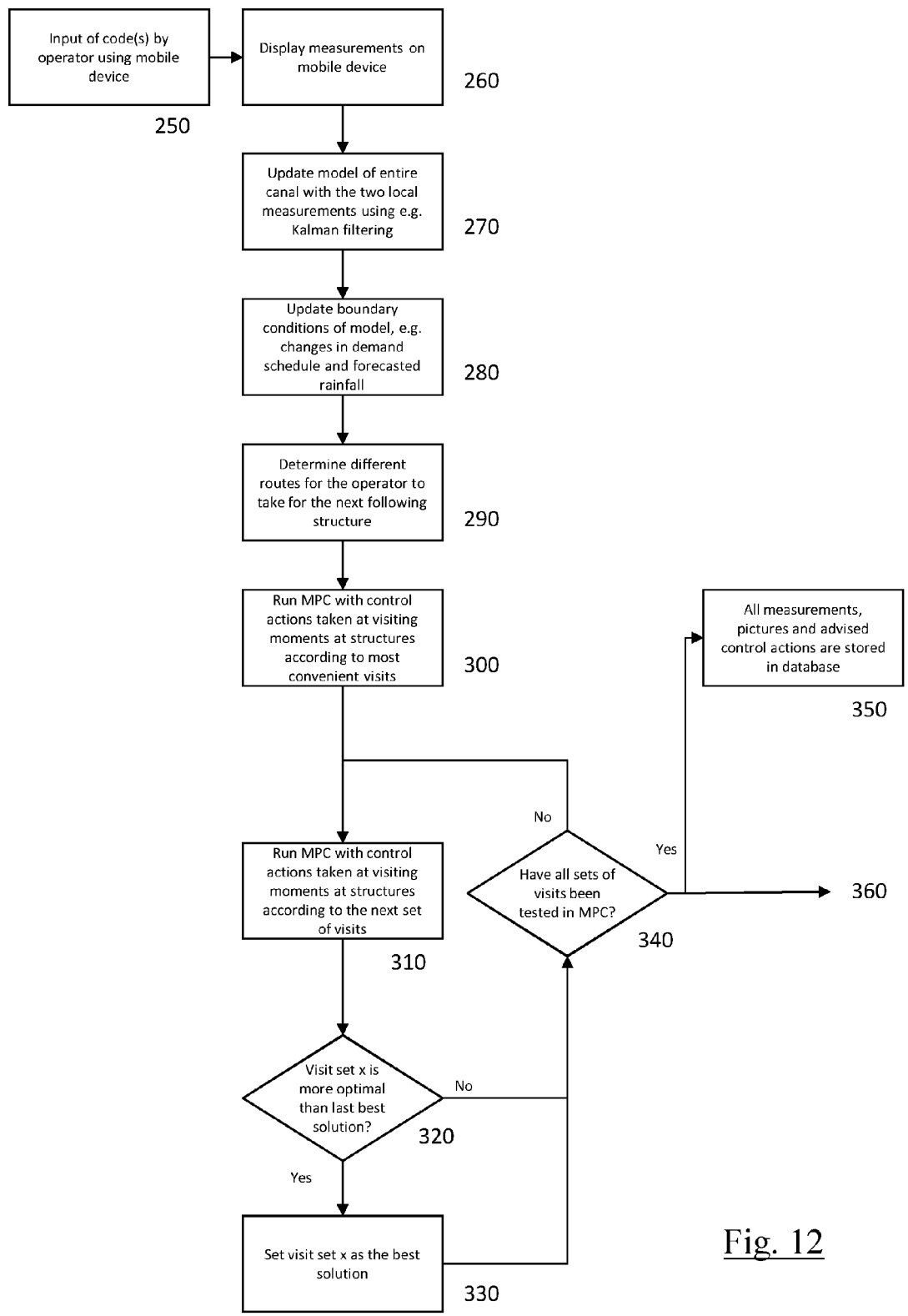

FIGS. 7-10 in combination depict a flow chart of a method of mobile canal control, applied with the aid of a local operator under supervision, using a canal control system in accordance with the invention. In comparison with the method described with respect to FIGS. 3-6, in FIG. 7 blocks 220 and 240 denote additional steps of Phase A which relate to verification of the identity of the operator. In FIG. 9 block 360 denotes an additional step of Phase B relating to the generation of a code to be sent to the operator in order to allow him access to adjust the adjustable actuator. In FIG. 10 blocks 400 and 420 denote additional steps of Phase C which relate to the unlocking of the adjustable actuator by the operator and to the time-limit within which he has to adjust the actuator. In FIG. 10 block 590 denotes an additional step of Phase D relating to action to be taken in the event of any mishap when taking a (second) picture of the water level and/or the setting of the adjustable actuator after the adjustable actuator has been set according to instructions received from the centralized master controller.

Figure 13:
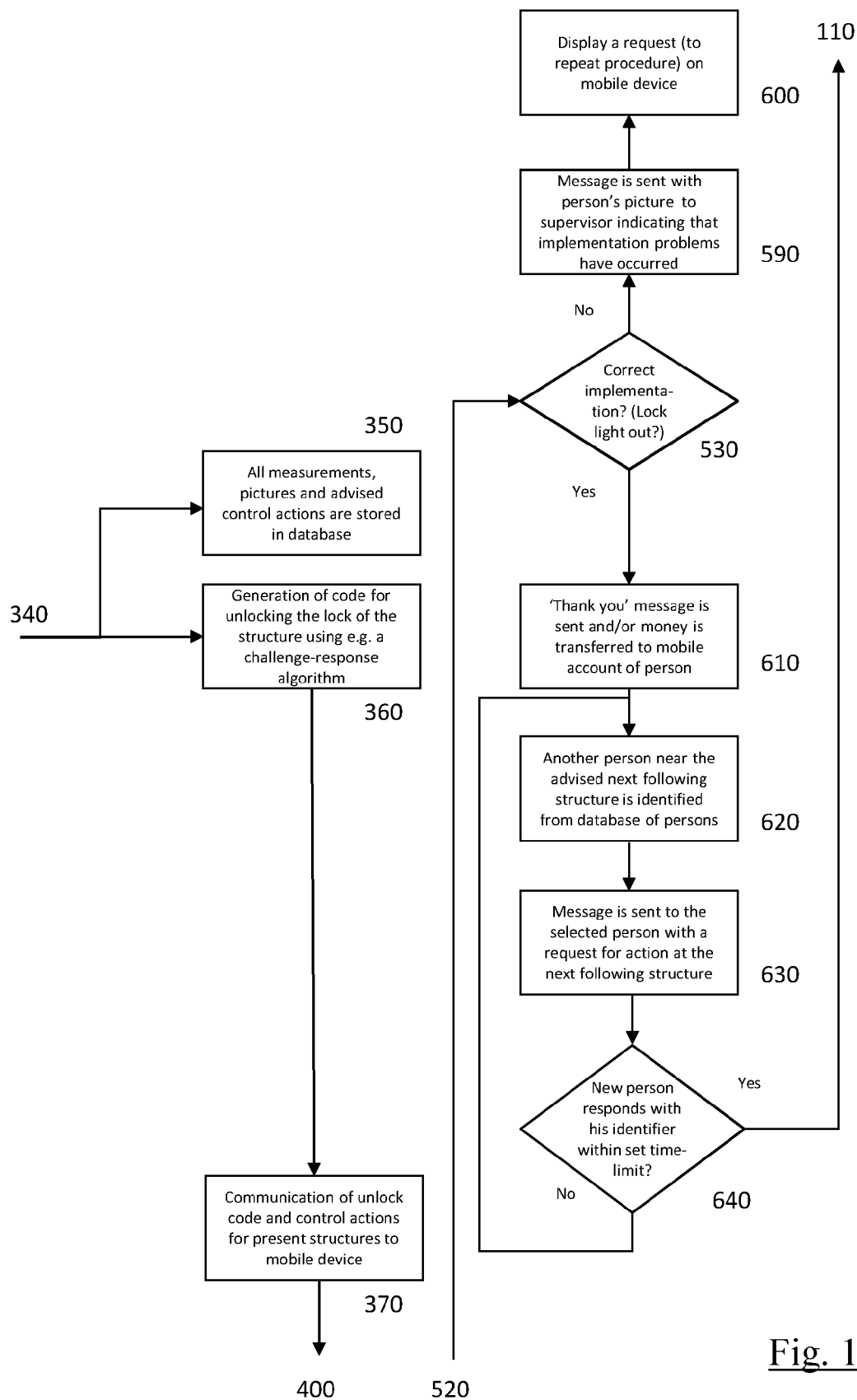
Figure 14:
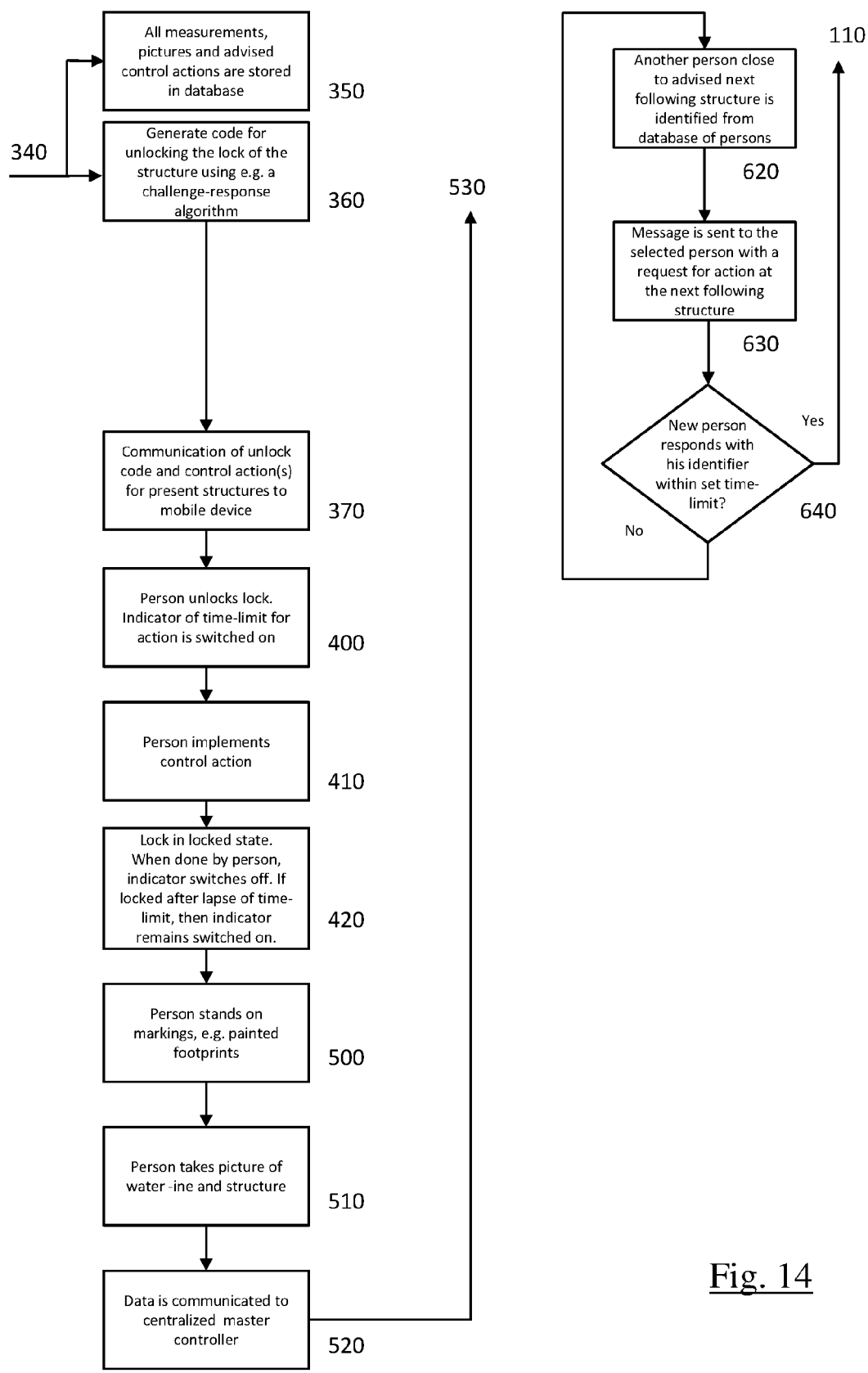

FIGS. 11-14 in combination depict a flow chart of a method of mobile canal control, applied with the aid of uninitiated volunteers, using a canal control system in accordance with the invention. In comparison with the method described with respect to FIGS. 3-6, in FIG. 13 block 360 denotes an additional step of Phase B relating to the generation of a code to be sent to the operator in order to allow him access to adjust the adjustable actuator. In FIG. 13 block 590 denotes an additional step of Phase D relating to action to be taken in the event of any mishap when taking a (second) picture of the water level and/or the setting of the adjustable actuator after the adjustable actuator has been set according to instructions received from the centralized master controller. In FIG. 13, blocks 610-640 denote additional steps of Phase D relating to a reward or incentive system for the operator who has taken action at the present local structure and to finding another operator for the following local structure. So accordingly there is no step such as in block 540 in the method of mobile canal control in which each local structure will possibly be visited by a different person. In FIG. 14 blocks 400 and 420 denote additional steps of Phase C which relate to the unlocking of the adjustable actuator by the operator and to the time-limit within which he has to adjust the actuator.

The invention will now be described in some detail. The objective of the canal control system according to the invention is to regulate the flow of water in the canal system. One way of achieving this goal is through a derivative way, e.g. by means of measuring and controlling the water level in a canal system. The water level is measured against a fixed point of the canal structure, e.g. a measuring line painted on or near a canal structure. Another way of achieving said goal is through a less derivative way, in which the relative flow of water in a canal system can be regulated by measuring and controlling the setting of an adjustable actuator such as a gate or a pump. Yet another way of achieving said goal is in a direct way, in which the flow of water in a canal system can be regulated by measuring and controlling the absolute flow of water, e.g. by means of a flow meter that can indicate the flow of water in absolute terms. Since measuring and control-devices, e.g. a gate or pump or flow meter, may be partly submerged in certain operating conditions, a movable marker that is visible above the water line is used to indicate the relative setting of the measuring and control-device, i.e. the relative setting of the gate or pump or flow meter.

The method of canal control according to the invention is based on the use of mobile communication means, such as through a mobile telephone, PDA, tablet, etc. The mobile device itself is provided with an app (an application, a programme as is generally known in regard of mobile devices). The app provides a user interface between the person using the device as part of a local slave controller, the centralized master controller and the canal infrastructure, in particular any given reference point or marker in the canal system at which a measurement of the water level and an eventual adjustment of an adjustable actuator at that point are to be taken. The method comprises three basic phases A-C and preferably also phase D.

Phase A comprises the following steps: A person operating a local slave controller arrives at a given reference point or marker in the canal system and makes use of his handheld mobile device, e.g. a mobile phone provided with two cameras, one at the front of the device and one at the rear of the device, to take a measurement, for example a picture, of the water line and the structure, in particular the current setting of an adjustable actuator, e.g. the current gate level. Optionally, the mobile device can be configured such that the camera at the front of the mobile device takes a picture of the operator and the camera at the rear of the device takes a picture of the water line and the gate level. In cases where the position of the adjustable part of the gate cannot always directly be registered by the camera of the mobile device, an extension piece may need to be fixed to the adjustable part of the gate as a proxy in order to make the (translated) position visible in the camera view.

Phase B comprises the following steps: The picture(s) and the GPS-coordinates of the given reference point or marker, are then sent, preferably without requiring the operator to take any further action, to a centralized master controller at a different location, which can be anywhere in the world, making use of the standard transmitter and receiver communication functions and the data connection of the device. When the data comprising the picture(s) and the geographical location of the given point of the canal system is received at the centralized master controller, it is interpreted with appropriate pattern-recognition algorithms which provide output in terms of measurements of the water level and the setting of the adjustable actuator at the given reference point or marker. These calculated measurements are stored in a database together with the data received from the local slave controller. Optionally, when the operator is not a fully trusted person, face-recognition of the person operating the local slave controller at the given reference point or marker is conducted. In particular, an identifier of the operator, preferably the picture of the operator that has been received at the centralized master controller is compared with an authenticated earlier picture of the intended operator. The identity of the operator is thus verified. Verification may be based on any type of identifier, e.g. a fingerprint, voice, personal identification number, etc. with which the identity of the operator can be established and verified. At the centralized master controller, the mathematical model of the canal system is updated with the measurements using appropriate data-assimilation techniques. Predictions of boundary conditions, such as forecasted rain and water-demand schedules, etc., are updated. Control actions are then calculated for the canal structure with the adjustable actuator where the operator is. Control actions are also calculated for all other adjustable actuators given the speed with which the operator can be at other points. The control actions are calculated using a particular type of optimum predictive control which will described later. The control action for the given reference point or marker of the canal system and/or for the setting of the relevant adjustable actuator, is communicated to the mobile device comprised in the local slave controller that is operated by the operator at the given reference point or marker. Optionally, a single-use and time-limited code, with which a security means of the adjustable actuator, for example a digitized lock, can be unlocked to be able to adjust the adjustable actuator, is also communicated to said mobile device. As a further option, an optimum solution for the next reference point or marker in the canal system at which to take a measurement of the water level or water flow after the current measurement at a particular reference point or marker has been processed by the centralized master controller as in Phase B is communicated to the mobile device comprised in the local slave controller for displaying the same as a human-readable instruction on the user interface comprised in the local slave controller.

Phase C comprises the following steps: If unlocking of the adjustable actuator is so required, using the single-use and time-limited code, the operator unlocks the security means such as a digitized lock, and adjusts the adjustable actuator conforming to the calculated setting received from the centralized master controller. The lock is either closed by the operator, or it reverts back to its closed state after a set period of time, for example two minutes.

Preferably, Phase D marks the end of the method and it comprises the following steps: A picture of the water line and the setting of the adjustable actuator is taken and this is sent to the centralized master controller as in Phase A for verification and storage. Phase D as such can be skipped e.g. when the operator is completely trusted. Preferably, it is mandatory so that any unauthorized change in the setting of the adjustable actuator can readily be determined.

The various steps of phases A-D will now be described in further detail. The water level and the setting of the adjustable actuator or structure are measured by taking a picture of the water line and the canal structure at the local reference point or marker. In the picture, preferably a logo, e.g. that of Mobile Canal Control, that comprises a QR-barcode is used as a reference. The logo is placed at an absolute, known position and known orientation in space so that based on this information, other points in the picture can be given a position in space. This can be done through the use of a water-line recognition algorithm. For 3-D localization, two logos may be used. In this way, the level of the water line can be determined and the setting of the reference point or marker (canal structure) can be determined. For pumps, pattern-recognition algorithms will be run with input provided by multiple pictures (i.e. movies) of pumps in operation at different levels. For convenience, two physical markers, e.g. two feet depicting the position of the operator when taking a picture, can be e.g. in the form of paint markings on the ground at the location where the picture needs to be taken. It can be arranged that when an operator presses the button for taking the picture with the camera at the rear of the mobile device comprised in the local slave controller, the camera at the front of the mobile device takes a picture of the face of the operator. The application running on the mobile device is configured to send both pictures to the central server without any further action needed to be taken by the operator, together with the coordinates of where the mobile device is at that moment. If the centralized master controller does not recognize the operator's face in comparison with the authentication version of the operator's face at the centralized master controller, then the operator receives an instruction from the centralized master controller to make a another picture of his face and-or to identify himself in another way. This other way of identification can be, e.g. by drawing his autograph in the air while using the mobile device to communicate his movements to the centralized master controller, by means of voice recognition, etc. If the water line or the setting of the adjustable actuator (the canal structure) cannot be determined, then the operator is asked to enter the level and the actuator setting by means of the interface of the mobile device. A staff gauge installed on the canal wall can be used for this purpose.

After identification of the location and optionally of the operator have succeeded, the measurements serve as input of calculation of subsequent control actions at the centralized master controller. Calculations are done on the basis of a Model of Predictive Control (MPC), more of which later. An internal model required for MPC is updated using the measurements received from the local slave controller. Such updating of a mobile model, i.e. a model in a configuration in which moving control actions are implemented, will be described briefly later. Updating is done through use of data-assimilation techniques. The boundary conditions of the model, such as e.g. forecasted weather and demand schedules for water delivery to users, are also updated. According to the invention, a novel and inventive MPC is used for calculating subsequent control actions (i.e. settings of the local adjustable actuators) of all adjustable actuators of the canal system, but only for times when these structures or adjustable actuators can actually be reached by the operator, given the empirically-based mobility of the operator, or even given real-time input of the operator relating to his mobility. This can be illustrated by means of a case in which an operator is to drive along a canal in a pick-up truck and to change the settings of several structures or adjustable actuators one by one. After working his way through a canal system from its beginning to its end, the operator is required to loop back to the beginning of the canal system and iterate his work, thus changing settings of the various adjustable actuators iteratively. In such a case, the MPC according to the invention will calculate the required change to the setting of the present adjustable actuator, the required change for the first following adjustable actuator over, say the next 15 minutes, the required change for the second following adjustable actuator over the next 35 minutes, and so forth. The model of predictive control will prescribe only the required change to the setting of the present adjustable actuator and the location of the first following local structure. In comparison with a serially laid-out canal system, the next structure or adjustable actuator to be visited in a network-type of water system, e.g. as a polder, is less obvious. To calculate which structure or adjustable actuator to visit first and what its setting should be, multiple MPC-scenarios are analyzed in an optimization procedure using the distances between the various structures or adjustable actuators.

All data, measurements, communicated pictures and advised and actually implemented control actions are available at all times through e.g. a web-based interface at the centralized master controller. This also allows all other information required as input for the MPC, e.g. water-demand schedules, weather forecasts, local irregularities, etc., to be entered or uploaded.

After calculations have been done with the MPC, the centralized master controller communicates the calculated control action for the preset structure of adjustable actuator to the local slave controller which displays the same in a human-readable form to the local operator. If required by the particular protocol in use (more of which later), then a code for unlocking an access security means, e.g. a digitized lock securing the adjustable actuator, is also communicated to the local operator. This unlocking code can be generated in a challenge-response manner using the internal clock of the lock and a identifier value (e.g. a number or one or more words) that is unique for the location. The location is identifiable by the centralized master controller through the coordinates of the actual location where a picture was taken and from where the same was communicated to the centralized master controller. The security code, the valid use of which may be time-limited, e.g. for only a few minutes, can be entered to unlock the adjustable actuator. This process can be supported by a suitable visible means, e.g. a light-emitting diode incorporated in the lock that lights up only when any action can be validly taken and otherwise is switched off. If the time-limit lapses without the correct code being entered, then a redundant step can be taken, e.g. that the lock cannot be locked any-more, so that a new code needs to be requested in order to complete the changing of the setting of the adjustable actuator. A new request for a new unlocking code can be implemented e.g. by requiring the operator to take a picture of the lock. This can be followed at the centralized master controller in order to ensure that the setting of the local structure or adjustable actuator has actually been changed and the lock regulating access to the adjustable actuator has been set to its locked state. As a last step, the centralized master controller can provide for verification of the change in the setting of the local structure or adjustable actuator by requiring a picture of at least the setting of the local adjustable actuator after the setting has been changed. This picture can be automatically sent to the centralized master controller for verification. Once verification has been completed, the centralized master controller can communicate information regarding the first following structure or adjustable actuator that is to be visited by the operator to the local slave controller comprising the mobile device used by the operator.

A hierarchical master-slave control structure is applied. The master controller controls the water level by adjusting the flow through an adjustable actuator (a local check structure such as a gate or a pump). The slave controller controls the flow through the check structure by adjusting the check structure inputs, such as the gate opening or the setting of the pump. There are several advantages of applying this hierarchical master-slave control structure. One advantage is that non-linearities of the check structure do not affect the water level control loop, which improves performance. Another advantage is that complicated requirements in regard of the operation of the check structure (e.g. operating requirements to avoid damage to the canal walls) can easily be taken into account. Yet another advantage is that interactions between two adjacent reaches are avoided, which improves performance (de-coupling). The slave (flow) control algorithm that is applied is a bisection algorithm that numerically 'inverts' the gate-discharge relation. The algorithms that are applied in this case have a guaranteed convergence and they can solve the occurring problems quickly enough as to allow real-time operation. To this end, gate-discharge relations do not need to be known exactly, nor do they have to be calibrated.

An example of water-line recognition code comprised at the centralized master server, or in some cases even in a local slave controller, is as follows. The code is written in Matlab. Various alternatives, condensed versions or extended versions will be readily understood by a skilled person:

```
command=sprintf('Picture=imread("%s");',file);
eval(command);
pause(0.2)
command=sprintf('delete %s',file);
eval(command);
pause(0.2)
clear directory ans bestand command file
cd 'C:\ Temp \ MobileCanalControl';
%convert the input image to grayscale format then convert this grayscale image
%to binary by thresholding
Picture=rgb2gray(Picture); %it transform the color image into a grayscale image
level=graythresh(Picture);
Picture=im2bw(Picture,level);
Black=0;
White=1;
DistanceMeters=0.0335;
DistanceToTargetLevel=0.1606;
Kp=2.2;
nPointAll=0;
```

```
for i=1:size(Picture,1)
  for j=1:size(Picture,2)
    if Picture(i,j)==Black
      iL=i;
      jL=j;
      nMatch=0;
      nMatch1=0;
      nMatch2=0;
      nMatch3=0;
      nMatch4=0;
      nMatch5=0;
      if Picture(iL,jL)==Black & jL<size(Picture,2)
        nMatch=nMatch+1;
        while Picture(iL,jL)==Black & jL<size(Picture,2)
        jL=jL+1;
        nMatch1=nMatch1+1;
        end
      end
      if Picture(iL,jL)==White & jL<size(Picture,2)
        nMatch=nMatch+1;
        while Picture(iL,jL)==White & jL<size(Picture,2)
          jL=jL+1;
          nMatch2=nMatch2+1;
        end
      end
      if Picture(iL,jL)==Black & jL<size(Picture,2)
        nMatch=nMatch+1;
        while Picture(iL,jL)==Black & jL<size(Picture,2)
          jL=jL+1;
          nMatch3=nMatch3+1;
        end
      end
      if Picture(iL,jL)==White & jL<size(Picture,2)
        nMatch+32nMatch+1;
        while Picture(iL,jL)==White & jL<size(Picture,2)
          jL=jL+1;
          nMatch4=nMatch4+1;
        end
      end
      if Picture(iL,jL)==Black & jL<size(Picture,2)
        nMatch=nMatch+1;
        while Picture(iL,jL)==Black & jL<size(Picture,2)
          jL=jL+1;
          nMatch5=nMatch5+1;
        end
      end
          if nMatch==5 & abs(nMatch1-nMatch2)<0.4*nMatch1 & abs(nMatch1-
nMatch4)<0.4*nMatch1 & abs(nMatch1-nMatch5)<0.4*nMatch1 &
abs(nMatch1+nMatch2+nMatch4+nMatch5-4/3*nMatch3)<0.4*nMatch1
            nPointAll=nPointAll+1;
            xPointAll(nPointAll)=j+0.5*(jL-j+1);
            yPointAll(nPointAll)=size(Picture,1)-i+1;
          end
    end
  end
end
if nPointAll==0
  disp('Picture not recognized. No anchor points found');
  break
end
nPoint=1;
Point(nPoint)=1;
nPoints(nPoint)=1;
Points(nPoint,nPoints(nPoint))=1;
for iPointAll=2:nPointAll
  Found=0;
  for iPoint=1:nPoint
    for iPoints=1:nPoints(iPoint)
      if abs(xPointAll(iPointAll)-xPointAll(Points(iPoint,iPoints)))<=3 &
abs(yPointAll(iPointAll)-yPointAll(Points(iPoint,iPoints)))<=3
        Found=1;
        nPoints(iPoint)=nPoints(iPoint)+1;
        Points(iPoint,nPoints(iPoint))=iPointAll;
        break;break;
      end
    end
  end
  if Found==0
    nPoint=nPoint+1;
```

```
        Point(nPoint)=iPointAll;
        nPoints(nPoint)=1;
        Points(nPoint,nPoints(nPoint))=Point(nPoint);
    end
end
for iPoint1=1:3
    nPoint1=0;
    for iPoint=1:nPoint
        if nPoints(iPoint)>nPoint1
            nPoint1=nPoints(iPoint);
            iPoint1Found=iPoint;
        end
    end
    nPoints1(iPoint1)=nPoints(iPoint1Found);
Points1(iPoint1,1:nPoints(iPoint1Found))=Points(iPoint1Found,1:nPoints(iPoint1Found));
    nPoints(iPoint1Found)=0;
end
nPoint=3;
nPoints=nPoints1;
Points=Points1;
for iPoint=1:nPoint
    xPoint(iPoint)=0;
    yPoint(iPoint)=0;
    for iPoints=1:nPoints(iPoint)
        xPoint(iPoint)=xPoint(iPoint)+xPointAll(Points(iPoint,iPoints));
        yPoint(iPoint)=yPoint(iPoint)+yPointAll(Points(iPoint,iPoints));
    end
    xPoint(iPoint)=xPoint(iPoint)/nPoints(iPoint);
    yPoint(iPoint)=yPoint(iPoint)/nPoints(iPoint);
end
%plot(xPointAll,yPointAll,'.',xPoint,yPoint,'xr')
Point1=0;
Point2=0;
for iPoint1=1:nPoint
    Angle=0;
    iSelectPoint2=0;
    for iPoint2=1:nPoint
        if iPoint1~=iPoint2
            iSelectPoint2=iSelectPoint2+1;
            Angle=Angle+atan2(yPoint(iPoint2)-yPoint(iPoint1),xPoint(iPoint2)-xPoint(iPoint1));
            SelectPoint2(iSelectPoint2)=iPoint2;
        end
    end
    if abs(mod(Angle,2*pi)-0.5*pi)<0.05*2*pi
        Point1=iPoint1;
        Point2=SelectPoint2(1);
        break
    elseif abs(mod(Angle,2*pi)-1.5*pi)<0.05*2*pi
        Point1=iPoint1;
        Point2=SelectPoint2(2);
        break
    end
end
if Point1==0 | Point2==0
    disp('Picture not recognized. The three anker points are not perpendicular so obviously not correctly read');
    return
end
Distance=sqrt((xPoint(Point2)-xPoint(Point1))^2+(yPoint(Point2)-yPoint(Point1))^2);
Angle=atan2(yPoint(Point2)-yPoint(Point1),xPoint(Point2)-xPoint(Point1));
xStep=cos(Angle);
yStep=sin(Angle);
x=xPoint(Point2)+xStep*Distance;
y=yPoint(Point2)+yStep*Distance;
i=round(size(Picture,1)-y+1);
j=round(x);
```

The Model of Predictive Control (MPC) as used in the invention will now be described. Model Predictive Control as such is a known methodology that provides a high performance in regard of canal control. The MPC as used in the invention is different than the known MPC. The difference is that according to the invention, control actions are not calculated for all structures for the same time instance and at a constant time interval, but that control actions are only calculated for time instances at which the operator can reach the related local structure or adjustable actuator. For example, in the case of a canal system in which an operator loops through the canal system from the beginning of the canal system to the end and then back to its beginning and so forth, the distances between the structures (control structures in the canal and the off-take structures) are L (m), the average speed with which the operator can move is V (m/s) and the time it take to execute all required actions at a local site is T (s). This gives time instances $[T_1=T, T_2=L_1/V+2T, T_3=(L_1+L_2)/V+3T, T_4=(L_1+L_2+L_3)/V+4T, \ldots]$ that can be determined by $L_x/V+T$ for each pair of adjacent structures.

The general formulation of Model Predictive Control for the prediction part thereof makes use of a model with control actions for all controlled actuators at all control time steps over the prediction horizon according to:

$$X=f(x_0,D,U)$$

where X is a vector of future states of the model, $x_0$ is the initial state of the model (updated using 'mobile model update'), D is the vector of disturbances over the prediction horizon and U is the vector of present and future control actions over the prediction horizon that are optimized in the controller. More specifically, U consists of the optimized control actions of all actuators at al control time steps over the prediction horizon according to:

$$U=[u_{1,1},u_{1,2},K,u_{1,m},u_{1,2},u_{2,2},K,u_{2,m},K,u_{n,1},u_{n,2}, K,u_{n,m}]$$

where $u_{i,j}$ is the control action at time step i at actuator j, n is the number of control time steps in the prediction horizon, m is the number of controlled actuators.

The formulation of Mobile Model Predictive Control (MMPC) has a different control actions vector $U^M$:

$$U^M=[u_{\{t1,l1\}},u_{\{t2,l2\}},K,u_{\{t_s,l_s\}}]$$

where $u_{\{tk,lk\}}$ are the control actions that have to be implemented at time $t_k$ and location $l_k$, where k is a discrete event of in total s discrete events in a route R along the adjustable actuators. $u_{\{t1,l1\}}$ is the present control action for the actuator where the mobile operator currently is at and it initiates the MMPC procedure. The route R is a function of the implementation time of one control action, the distance between actuators and the average speed with which the operator who implements the control actions travels. The sequence of locations in which an adjustment of the actuator is to be implemented can be given as additional information for the MMPC problem as operational constraints or it can be calculated by means of optimization in the controller (comparable with the well-known 'travelling-salesman'-problem).

Updating of the MPC will now be described. Kalman-filtering, for example, is a-known way of updating a model through measurements. Weights are given to the estimated accuracy of the model states. Weights are also given to the estimated accuracy of the measurements. This principle is used in a mobile model update version according to the invention. Instead of a situation where normally all measurements are available at once, according to the invention only the measurements of the visited site are used to update the model. Any decrease in the accuracy of the model states is not as great as to adversely affect the accuracy of the calculated control actions and it greatly enhances the speed and the ease with which the optimizations can be calculated. It also decreases the time needed between the taking of a measurement locally and verification of an actual change of the setting of a canal structure or adjustable actuator.

The security means for regulating access to a local canal structure or adjustable actuator will now be described. An interface at the front side of the padlock is e.g. keypad comparable with that of a mobile phone, with keys marked as 1 2 3; 4 5 6; 7 8 9; and R 0 E, where R is a Reset button and E is an Enter button. A code, e.g. a six-digit code, is required to unlock the security means. As described previously, such a code is communicated by the centralized master controller to the local slave controller on the basis of the operator at a local canal structure taking a picture of the security means, and the operator can enter this code using the keypad. In a digitized lock, its chip can reverse-calculate this number using the unique identifier number of the lock (which is e.g. a six-digit number known at the centralized master controller) in terms of a point in time (a rational number which e.g. stands for the number of days since 2010). If any difference between this point in time and the present time in the clock of the chip in the lock is less than, say 900 seconds (0.0104167 days), then a signal is sent to the unlocking mechanism. The unlocking mechanism can be e.g. a small electronic relay that is powered for a limited period of time, say 5 minutes. Powering the relay will move a pin out of a ring in the lock. The ring is attached to the end of the shackle of the lock, so that it can be opened. If and when the pen is not in the ring, a red light-emitting diode will light up. After five minutes or earlier if R is pressed, the relay is de-powered to allow the pin to move back in the ring. The hinge of the lock can be pushed back into the lock body and held there when pressing R. If the pin is not in the ring, then the light-emitting diode will remain switched on. To power the relay (in order to move the pin) once again, the code needs to be re-entered. If more than 900 seconds have passed without the correct code being entered, then a new code is required and it can be requested by taking a picture of the lock as described previously.

The invention thus provides a canal control system comprising a centralized master controller, a local slave controller, a wireless communication system between the centralized master controller and the local slave controller, a (fixed) reference point or (movable) marker relating to the water level or water flow in the canal system, and an adjustable actuator in the canal system, such as an adjustable gate or pump, whereby the centralized controller executes an algorithm relating to a model of predictive control, which algorithm comprises code for calculating control actions for adjustable actuators in the canal system at time instances during which an operator operating the local slave controller can reach the adjustable actuators which are to be adjusted next. In one embodiment, the water level at a particular point in the canal system is measured and controlled to regulate the flow of water in the canal system. In another embodiment, the setting of the adjustable actuator is measured and controlled to regulate the flow of water in the canal system. This latter embodiment allows for the model of predictive control to be updated, preferably using only the measurement of the water level and the setting of the adjustable actuator relating to a given reference point or marker which have been sent to the centralized master controller.

The invention claimed is:

1. A canal control system for controlling the water level or water flow in a canal system, comprising:
   (a) a centralized master controller,
   (b) a local slave controller,
   (c) a wireless communication system between the centralized master controller and the local slave controller,
   (d) a fixed reference point or a movable marker relating to the water level or water flow in the canal system, and
   (e) an adjustable actuator in the canal system,
   whereby the local slave controller comprises a mobile wireless device comprising (i) technical means for viewing or recording a measurement of the water level or water flow relative to the fixed reference point or the movable marker in the canal system, (ii) technical means for sending the measurement of the water level or water flow as an input signal to the centralized master controller, (iii) technical means for receiving an output control signal from the centralized master controller, and (iv) a user interface for displaying a human-readable instruction based on the output signal received from the centralized master controller, wherein the human-readable instruction is to be implemented by a human operator with respect to the adjustable actuator,
   wherein the centralized master controller and the local slave controller are configured to interact mutually in the execution of a predictive control algorithm using a mathematical model of the canal system using software that comprises code for a model of predictive control adapted for use with a mobile device, and the code for the model of predictive control comprises code for calculating control actions for adjustable actuators in the canal system at time instances when an operator operating the local slave controller can actually reach the next adjustable actuator which is to be adjusted.

2. A canal control system according to claim 1, wherein the mobile wireless device comprised in the local slave controller in turn comprises (v) technical means for viewing or recording a measurement of the state or setting of the adjustable actuator in the canal system, and (vi) technical means for sending the measurement of the state or setting of the adjustable actuator as an input signal to the centralized master controller.

3. A canal control system according to claim 1, wherein the centralized master controller and the local slave controller are implemented in separate devices.

4. A canal control system according to claim 1, wherein the centralized master controller and the local slave controller are integrated in a single mobile device.

5. A canal control system according to claim 1, wherein the centralized master controller and the local slave controller are configured additionally to interact mutually to update the mathematical model of the canal system in real-time.

6. A canal control system according to claim 1, further comprising comprises means for verification of the location of any given reference point or marker in the canal system.

7. A canal control system according to claim 6, wherein the means for verification comprise a digitally-readable identifier, including a bar code or a QR-code, positioned at or near the reference point or marker in the canal system.

8. A canal control system according to claim 1, further comprising additional means for controlling access to the adjustable actuator in the canal system.

9. A canal control system according to claim 8, wherein the additional means comprise a security code-based means including a digitized lock.

10. A canal control system according to claim 1, wherein the mathematical model of the canal system further uses software that comprises code for water-level recognition adapted for use with the mobile device.

11. A canal control system according to claim 10, wherein the software additionally comprises code for providing an optimum calculated solution for the next reference point or marker in the canal system at which to take a measurement of the water level or water flow after a measurement of the water level and/or the setting of an adjustable actuator at a particular reference point or marker has (have) been processed by the centralized master controller.

12. A canal control system according to claim 1, wherein the software additionally comprises code for updating the model of predictive control adapted for use with the mobile device.

13. A canal control system according to claim 12, wherein the code for updating the model of predictive control comprises code with which only the measurement of the water level and/or the setting of the adjustable actuator which has (have) been sent to the centralized master controller is (are) used for updating the model of predictive control.

14. A canal control system according to claim 1, wherein the canal system at any given reference point or marker comprises a remote-controlled measurement-taking device.

15. A canal control system according to claim 1, wherein the canal system at any given reference point or marker comprises a measuring or recording device operating at a non-visible wave frequency or at adjustable time intervals.

16. A method of controlling the water level or water flow in a canal system using a canal control system according to claim 1, wherein the method comprises the phases of:
   (A) taking a measurement of the water level or water flow relative to a reference point or marker in the canal system using the mobile, wireless device comprised in the local slave controller;
   (B) sending the measurement of phase A to the centralized master controller for processing, updating the mathematical model of the canal system, execution of a predictive control algorithm using a mathematical model of the canal system for calculating the control setting for the reference point or marker of which the measurement was sent, and sending the calculated control setting from the centralized master controller to the local slave controller; and
   (C) reading of the calculated control setting by a person operating the local slave controller, and adjustment of the adjustable actuator in the canal system including an adjustable gate or pump accordingly.

17. A method of controlling the water level or water flow in a canal system according to claim 16, wherein the method additionally comprises a phase (D) of taking another measurement of the water level or water flow relative to a reference point or marker in the canal system using the mobile, wireless device comprised in the local slave controller after adjustment of the gate or pump according phase (C).

18. A method of controlling the water level or water flow in a canal system using a canal control system according to claim 16, wherein phase (A) additionally comprises the step of verification of the identity of the person operating the local slave controller at a particular reference point or marker at which a measurement is being taken, by sending a view of said operator to the centralized master controller.

19. A method of controlling the water level or water flow in a canal system using a canal control system according to claim 16, wherein phase (B) additionally comprises the step of sending a code to the local slave controller for the purpose of unlocking the security means that allows access to the adjustable actuator which is to be adjusted.

20. A method of controlling the water level or water flow in a canal system using a canal control system according to claim 16, wherein the method additionally comprises a step of calculating an optimum solution for the next reference point or marker in the canal system at which to take a measurement of the water level or water flow after a measurement of the water level and/or the setting of an adjustable actuator at a particular reference point or marker has been processed by the centralized master controller, and sending the optimum solution as an output signal to the local slave controller for displaying the optimum solution in the form of a human-readable instruction on the user interface comprised in the local slave controller.

21. A canal control system according to claim 1, wherein the adjustable actuator in the canal system includes an adjustable gate or a pump.

22. A canal control system according to claim 1, wherein the canal system is an irrigation canal or a drainage canal.

23. A canal control system for controlling the water level or water flow in a canal system, comprising:
   (a) a centralized master controller,
   (b) a local slave controller,
   (c) a wireless communication system between the centralized master controller and the local slave controller,
   (d) a fixed reference point or a movable marker relating to the water level or water flow in the canal system, and
   (e) an adjustable actuator in the canal system,
   whereby the local slave controller comprises a mobile wireless device comprising (i) technical means for viewing or recording a measurement of the water level or water flow relative to the fixed reference point or the movable marker in the canal system, (ii) technical means for sending the measurement of the water level or water flow as an input signal to the centralized master controller, (iii) technical means for receiving an output control signal from the centralized master controller, and (iv) a user interface for displaying a human-readable instruction based on the output signal received from the centralized master controller, wherein the human-readable instruction is to be implemented by a human operator with respect to the adjustable actuator,
   wherein the centralized master controller and the local slave controller are configured to interact mutually in the execution of a predictive control algorithm using a mathematical model of the canal system using software that comprises code for a model of predictive control adapted for use with a mobile device, the software additionally comprises code for updating the model of predictive control adapted for use with the mobile device, and the code for updating the model of predictive control comprises code implementing Kalman filtering.

24. The canal control system of claim 23, wherein the centralized master controller and the local slave controller are configured to interact mutually to update a mathematical model of the canal system in real-time.

25. The canal control system of claim 23, wherein the centralized master controller and the local slave controller are configured to interact mutually in the execution of a predictive control algorithm using a mathematical model of the canal system using software that comprises code for water-level recognition.

26. The canal control system of claim 25, wherein the software additionally comprises code for providing an optimum calculated solution for the next reference point or marker in the canal system at which to take a measurement of the water level or water flow after a measurement of the water level and/or the setting of an adjustable actuator at a particular reference point or marker has (have) been processed by the centralized master controller.

27. The canal control system of claim 23, wherein the canal system at any given reference point or marker comprises a remote-controlled measurement-taking device.

28. The canal control system of claim 23, wherein the canal system at any given reference point or marker comprises a measuring or recording device operating at a non-visible wave frequency or at adjustable time intervals.

29. The canal control system of claim 23, wherein the adjustable actuator in the canal system includes an adjustable gate or a pump.

30. The canal control system of claim 23, wherein the canal system is an irrigation canal or a drainage canal.

31. A method of controlling the water level or water flow in a canal system using a canal control system comprising: a centralized master controller, a local slave controller, a wireless communication system between the centralized master controller and the local slave controller, a fixed reference point or a movable marker relating to the water level or water flow in the canal system, and an adjustable actuator in the canal system, whereby the local slave controller comprises a mobile wireless device comprising (i) technical means for viewing or recording a measurement of the water level or water flow relative to the fixed reference point or the movable marker in the canal system, (ii) technical means for sending the measurement of the water level or water flow as an input signal to the centralized master controller, (iii) technical means for receiving an output control signal from the centralized master controller, and (iv) a user interface for displaying a human-readable instruction based on the output signal received from the centralized master controller, the human-readable instruction is to be implemented by a human operator with respect to the adjustable actuator, the method comprises the phases of:
   (A) taking a measurement of the water level or water flow relative to the reference point or the marker in the canal system using the mobile wireless device and verifying of the particular reference point or marker at which a measurement is being taken, by sending a view of the means of digitally-readable identifier, including a bar code or a QR-code, positioned at or near the reference point or marker in the canal system, to the centralized master controller;
   (B) sending the measurement of phase A to the centralized master controller for processing, updating the mathematical model of the canal system, execution of a predictive control algorithm using a mathematical model of the canal system for calculating the control setting for the reference point or marker of which the measurement was sent, and sending the calculated control setting from the centralized master controller to the local slave controller; and
   (C) reading of the calculated control setting by a person operating the local slave controller, and adjustment of the adjustable actuator in the canal system including an adjustable gate or pump accordingly.

32. A control system for controlling the water level and/or water flow in a canal system, the control system comprising:
   a user adjustable actuator disposed in the canal system and configured to control water level and/or water flow in the canal system;

a centralized master controller; and a hand-held device including a processing system and a wireless transceiver configured to wirelessly communicate with the centralized master controller, the processing system configured to at least:
- in response to an input on the hand-held device, capture, using a camera, an image of a fixed reference point and a movable marker in the canal system, the fixed reference point and the movable marker providing a measurement of the water level and/or water flow relative to a fixed reference point and/or the movable marker in the canal system;
- transmit, via the wireless transceiver, the captured image as an input signal to the centralized master controller for determining the water level and/or water flow relative to a fixed reference point and/or the movable marker in the canal system;
- receive, via the wireless transceiver, an output control signal from the centralized master controller; and
- display, via a user interface displayed on a display of the hand-held device, human-readable instructions based on the output signal received from the centralized master controller, the human-readable instructions providing instructions for controlling the user adjustable actuator.

33. The canal control system of claim 32, wherein the centralized master controller and the hand-held device are configured to interact mutually to update a mathematical model of the canal system in real-time.

34. The canal control system of claim 32, wherein the centralized master controller and the hand-held device are configured to interact mutually in the execution of a predictive control algorithm using a mathematical model of the canal system using software that comprises code for water-level recognition.

35. The canal control system of claim 34, wherein the software additionally comprises code for providing an optimum calculated solution for the next reference point or marker in the canal system at which to take a measurement of the water level or water flow after a measurement of the water level and/or the setting of an adjustable actuator at a particular reference point or marker has (have) been processed by the centralized master controller.

36. The canal control system of claim 32, wherein the canal system at any given reference point or marker comprises a remote-controlled measurement-taking device.

37. The canal control system of claim 32, wherein the canal system at any given reference point or marker comprises a measuring or recording device operating at a non-visible wave frequency or at adjustable time intervals.

38. The canal control system of claim 32, wherein the adjustable actuator in the canal system includes an adjustable gate or a pump.

39. The canal control system of claim 32, wherein the canal system is an irrigation canal or a drainage canal.

* * * * *